US012587951B2

(12) United States Patent
Madan et al.

(10) Patent No.: US 12,587,951 B2
(45) Date of Patent: Mar. 24, 2026

(54) PROVISIONING HEADLESS WiFi DEVICES AND RELATED SYSTEMS, METHODS AND DEVICES

(71) Applicant: Microchip Technology Incorporated, Chandler, AZ (US)

(72) Inventors: Vaibhav Madan, Uttar Pradesh (IN); Himanshu Seth, Delhi (IN)

(73) Assignee: Microchip Technology Incorporated, Chandler, AZ (US)

( * ) Notice: Subject to any disclaimer, the term of this patent is extended or adjusted under 35 U.S.C. 154(b) by 588 days.

(21) Appl. No.: 17/659,705

(22) Filed: Apr. 19, 2022

(65) Prior Publication Data

US 2022/0400428 A1      Dec. 15, 2022

Related U.S. Application Data

(60) Provisional application No. 63/202,467, filed on Jun. 11, 2021.

(51) Int. Cl.
| | |
|---|---|
| *H04W 48/16* | (2009.01) |
| *H04W 12/06* | (2021.01) |
| *H04W 12/55* | (2021.01) |
| *H04W 76/11* | (2018.01) |
| *H04W 84/12* | (2009.01) |
| *H04W 88/10* | (2009.01) |

(52) U.S. Cl.
CPC ........... *H04W 48/16* (2013.01); *H04W 12/06* (2013.01); *H04W 12/55* (2021.01); *H04W 76/11* (2018.02); *H04W 84/12* (2013.01); *H04W 88/10* (2013.01)

(58) Field of Classification Search
CPC ..... H04W 48/16; H04W 12/06; H04W 12/55; H04W 76/11; H04W 84/12; H04W 88/10
See application file for complete search history.

(56) References Cited

U.S. PATENT DOCUMENTS

| | | | | |
|---|---|---|---|---|
| 9,900,919 | B1 * | 2/2018 | Butler | H04W 52/0229 |
| 10,462,829 | B2 * | 10/2019 | Meng | H04W 12/068 |
| 10,638,417 | B1 | 4/2020 | Baki et al. | |
| 11,974,339 | B2 * | 4/2024 | Madan | H04W 76/11 |
| 2015/0023183 | A1 | 1/2015 | Ilsar et al. | |
| 2016/0182624 | A1 * | 6/2016 | Liang | H04L 12/12 |
| | | | | 709/228 |
| 2016/0269527 | A1 * | 9/2016 | Ren | H04W 8/20 |
| 2019/0304290 | A1 * | 10/2019 | Atkins | G08B 25/003 |

(Continued)

FOREIGN PATENT DOCUMENTS

WO       2013/158653 A1    10/2013

OTHER PUBLICATIONS

International Search Report for International Application No. PCT/US2022/071788, mailed Jul. 22, 2022, 5 pages.

(Continued)

*Primary Examiner* — Jay P Patel

(74) *Attorney, Agent, or Firm* — TraskBritt

(57) ABSTRACT

One or more examples of systems, methods and devices are disclosed for provisioning a headless WiFi device. A method may include: inferring a channel identifier of a desired WiFi router access point, establishing a communication link with a provisioning WiFi device utilizing the channel identifier, and establishing a communication link with the WiFi router access point utilizing a channel identifier provided by the provisioning WiFi device.

22 Claims, 14 Drawing Sheets

INFER THAT A FIRST CHANNEL IDENTIFIER IS A CHANNEL IDENTIFIER OF A DESIRED WIFI ROUTER ACCESS POINT 902

ESTABLISH A FIRST COMMUNICATION LINK WITH A PROVISIONING WIFI DEVICE UTILIZING THE FIRST CHANNEL IDENTIFIER 904

ESTABLISH A SECOND COMMUNICATION LINK WITH A WIFI ROUTER ACCESS POINT UTILIZING A SECOND CHANNEL IDENTIFIER PROVIDED BY THE PROVISIONING WIFI DEVICE 906

(56)     References Cited

U.S. PATENT DOCUMENTS

2021/0100045  A1*    4/2021  Tsuji ..................... H04W 76/11
2022/0095297  A1*    3/2022  Ryu ........................ H04W 8/24
2022/0182119  A1*    6/2022  Ravichandran ...... H04B 7/0626
2022/0322467  A1*   10/2022  Madan ................. H04W 76/14
2023/0093016  A1*    3/2023  Shi .......................... H04L 41/12
                                                        370/329

OTHER PUBLICATIONS

International Written Opinion for International Application No. PCT/US2022/071788, mailed Jul. 22, 2022, 9 pages.

* cited by examiner

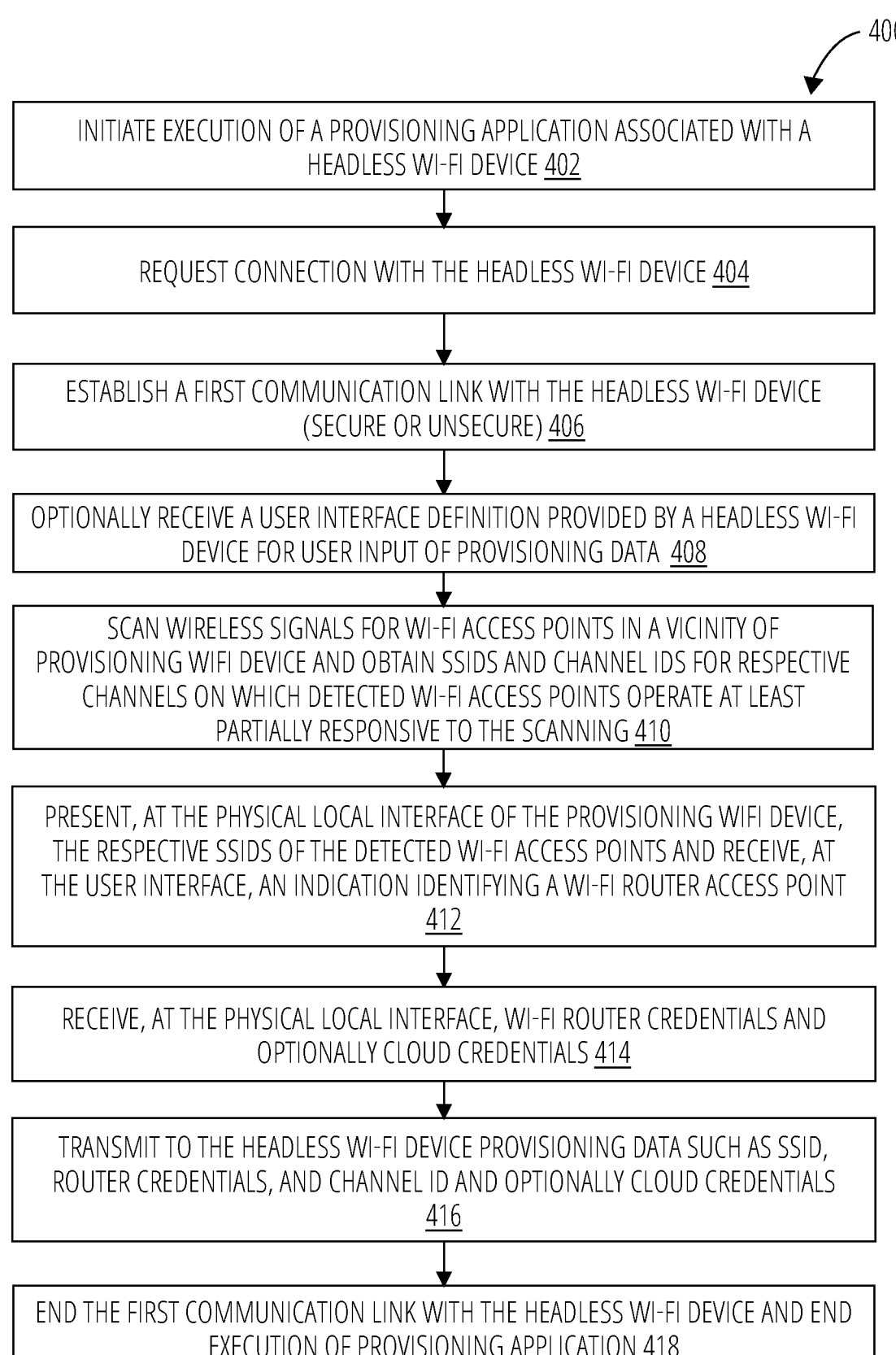

INITIATE EXECUTION OF A PROVISIONING APPLICATION ASSOCIATED WITH A HEADLESS WI-FI DEVICE 402

REQUEST CONNECTION WITH THE HEADLESS WI-FI DEVICE 404

ESTABLISH A FIRST COMMUNICATION LINK WITH THE HEADLESS WI-FI DEVICE (SECURE OR UNSECURE) 406

OPTIONALLY RECEIVE A USER INTERFACE DEFINITION PROVIDED BY A HEADLESS WI-FI DEVICE FOR USER INPUT OF PROVISIONING DATA 408

SCAN WIRELESS SIGNALS FOR WI-FI ACCESS POINTS IN A VICINITY OF PROVISIONING WIFI DEVICE AND OBTAIN SSIDS AND CHANNEL IDS FOR RESPECTIVE CHANNELS ON WHICH DETECTED WI-FI ACCESS POINTS OPERATE AT LEAST PARTIALLY RESPONSIVE TO THE SCANNING 410

PRESENT, AT THE PHYSICAL LOCAL INTERFACE OF THE PROVISIONING WIFI DEVICE, THE RESPECTIVE SSIDS OF THE DETECTED WI-FI ACCESS POINTS AND RECEIVE, AT THE USER INTERFACE, AN INDICATION IDENTIFYING A WI-FI ROUTER ACCESS POINT 412

RECEIVE, AT THE PHYSICAL LOCAL INTERFACE, WI-FI ROUTER CREDENTIALS AND OPTIONALLY CLOUD CREDENTIALS 414

TRANSMIT TO THE HEADLESS WI-FI DEVICE PROVISIONING DATA SUCH AS SSID, ROUTER CREDENTIALS, AND CHANNEL ID AND OPTIONALLY CLOUD CREDENTIALS 416

END THE FIRST COMMUNICATION LINK WITH THE HEADLESS WI-FI DEVICE AND END EXECUTION OF PROVISIONING APPLICATION 418

FIG. 4

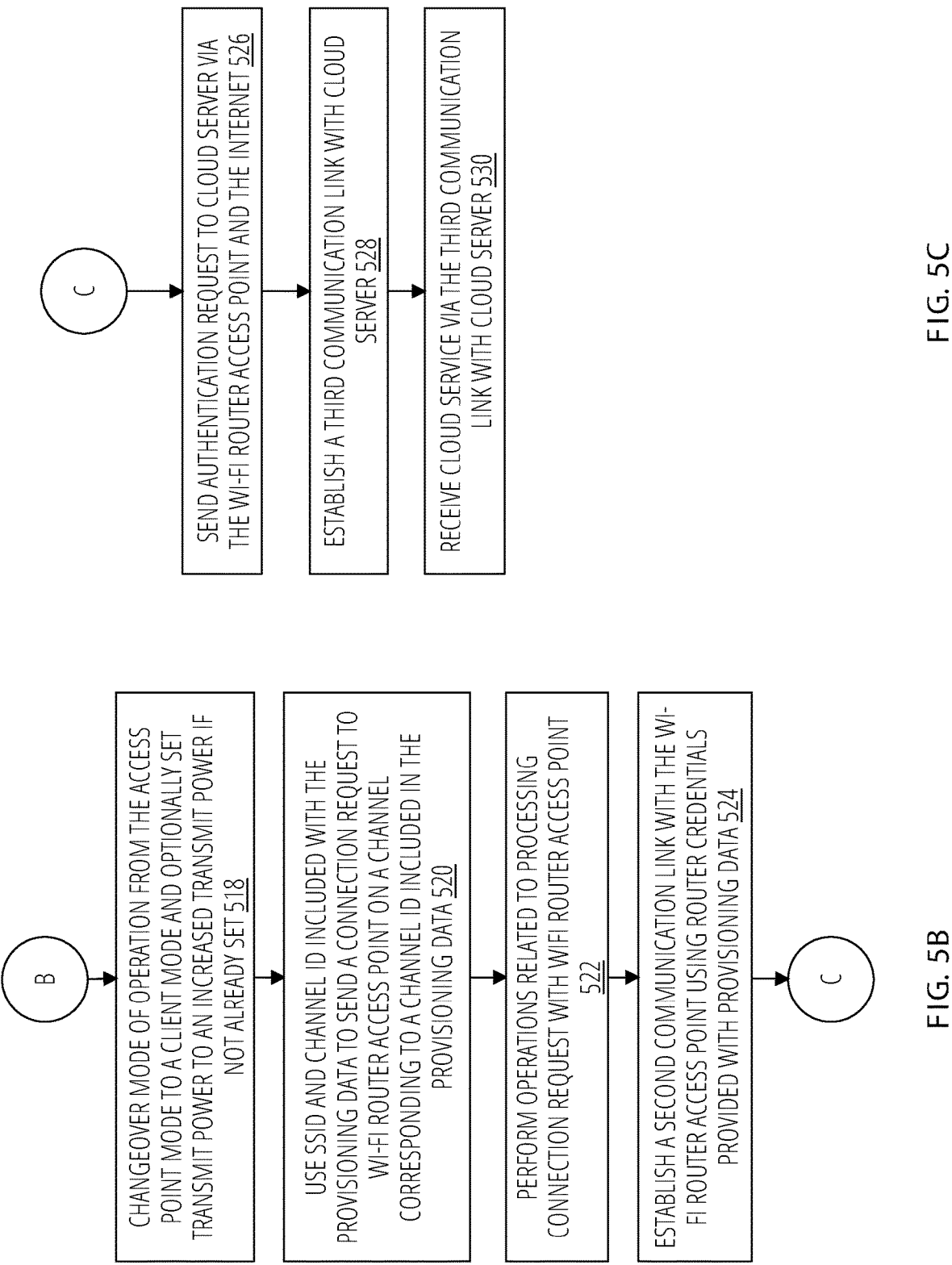

SEND AUTHENTICATION REQUEST TO CLOUD SERVER VIA THE WI-FI ROUTER ACCESS POINT AND THE INTERNET 526

ESTABLISH A THIRD COMMUNICATION LINK WITH CLOUD SERVER 528

RECEIVE CLOUD SERVICE VIA THE THIRD COMMUNICATION LINK WITH CLOUD SERVER 530

FIG. 5C

CHANGEOVER MODE OF OPERATION FROM THE ACCESS POINT MODE TO A CLIENT MODE AND OPTIONALLY SET TRANSMIT POWER TO AN INCREASED TRANSMIT POWER IF NOT ALREADY SET 518

USE SSID AND CHANNEL ID INCLUDED WITH THE PROVISIONING DATA TO SEND A CONNECTION REQUEST TO WI-FI ROUTER ACCESS POINT ON A CHANNEL CORRESPONDING TO A CHANNEL ID INCLUDED IN THE PROVISIONING DATA 520

PERFORM OPERATIONS RELATED TO PROCESSING CONNECTION REQUEST WITH WIFI ROUTER ACCESS POINT 522

ESTABLISH A SECOND COMMUNICATION LINK WITH THE WI-FI ROUTER ACCESS POINT USING ROUTER CREDENTIALS PROVIDED WITH PROVISIONING DATA 524

FIG. 5B

Input Home AP Configuration

SSID:

Password:

Submit

Click the "Submit" button to send the configuration to the device.

602

Input Home AP and Cloud Configuration

SSID:

Password:

Cloud Username:

Cloud Password:

Submit

Click the "Submit" button to send the configuration to the device.

604

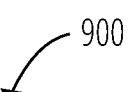

900

INFER THAT A FIRST CHANNEL IDENTIFIER IS A CHANNEL IDENTIFIER OF A DESIRED WIFI ROUTER ACCESS POINT 902

↓

ESTABLISH A FIRST COMMUNICATION LINK WITH A PROVISIONING WIFI DEVICE UTILIZING THE FIRST CHANNEL IDENTIFIER 904

↓

ESTABLISH A SECOND COMMUNICATION LINK WITH A WIFI ROUTER ACCESS POINT UTILIZING A SECOND CHANNEL IDENTIFIER PROVIDED BY THE PROVISIONING WIFI DEVICE 906

FIG. 9

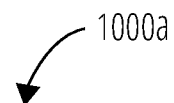

1000a

INITIALIZE A WIFI CONCURRENT MODE FOR OPERATING CONCURRENTLY IN A WIFI STATION MODE AND A WIFI ACCESS POINT MODE <u>1002</u>

PROBE (E.G., UTILIZING A STATION MODE OF THE CONCURRENT MODE) WIFI SIGNALS AND WIFI CHANNELS FOR PRESENCE OF WIFI ROUTER ACCESS POINTS (E.G., FOR IEEE 802.11 WIRELESS LOCAL AREA NETWORK (WLAN) SERVICE SET IDENTIFIER (SSID) BROADCAST BY ONE OR MORE WIFI ROUTER ACCESS POINT) <u>1004</u>

CAPTURE INFORMATION ABOUT DETECTED WIFI ROUTER ACCESS POINTS (E.G., SSID, CHANNEL ID, AND A SIGNAL MEASUREMENT) <u>1006</u>

INFER A CHANNEL ID FOR A DESIRED WIFI ROUTER ACCESS POINT AT LEAST PARTIALLY RESPONSIVE TO THE CAPTURED INFORMATION <u>1008</u>

OPTIONALLY SET CHANNEL ID FOR ACCESS POINT MODE OF THE CONCURRENT MODE <u>1010</u>

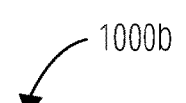
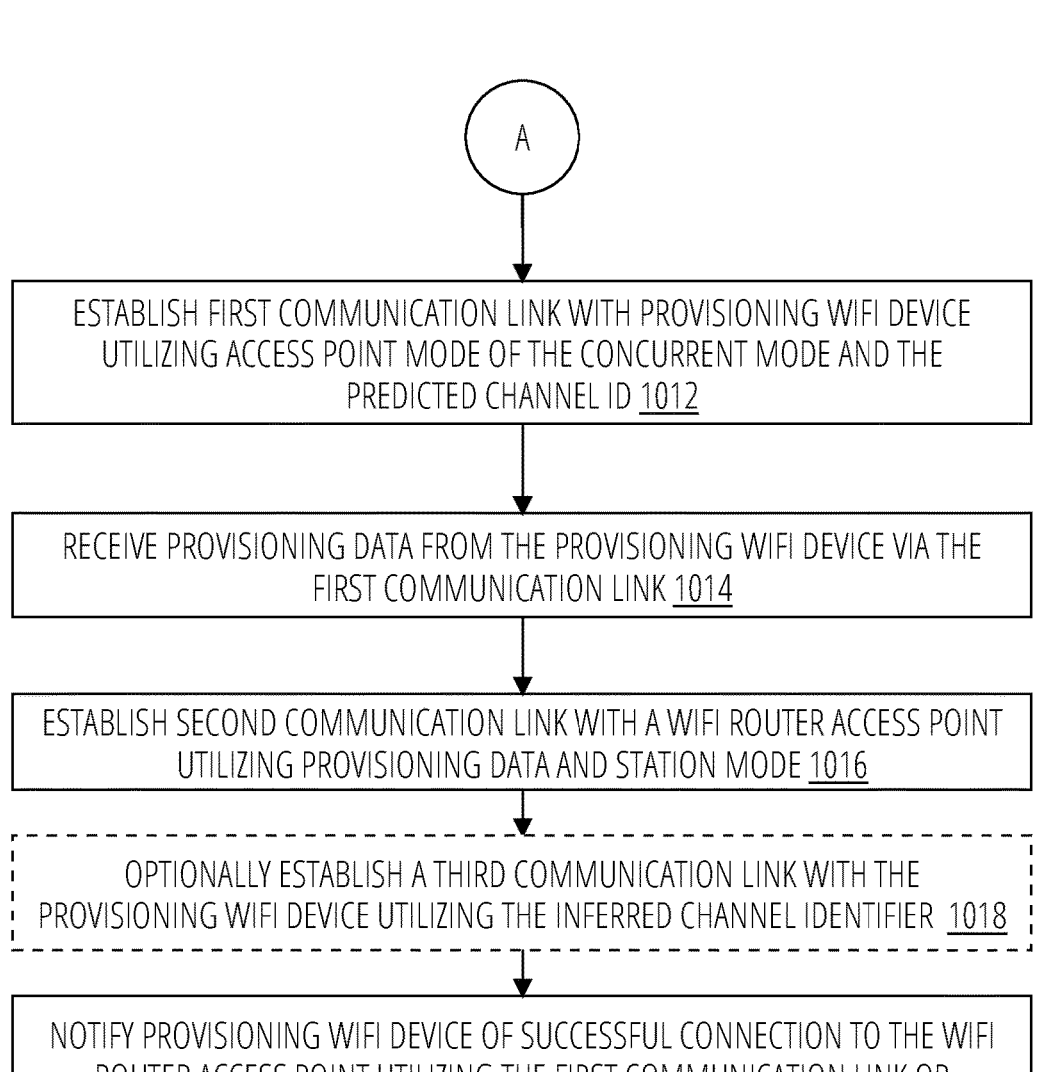
FIG. 10B

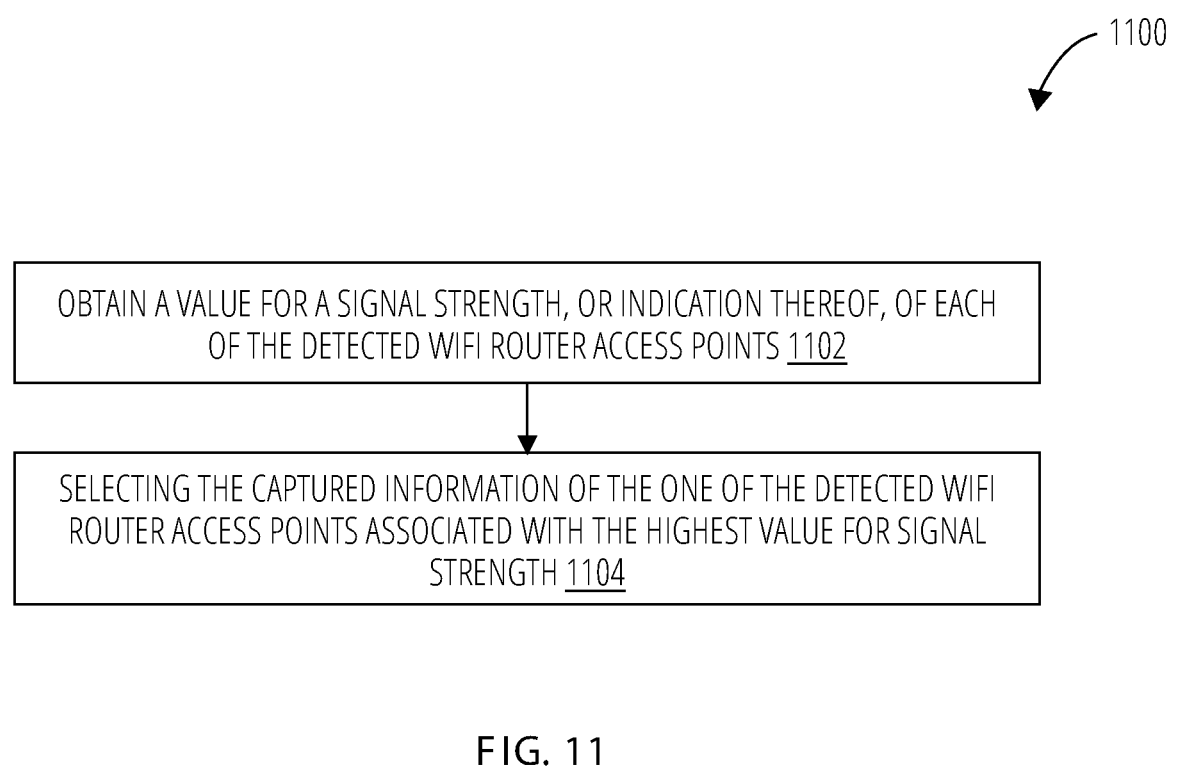

1100

OBTAIN A VALUE FOR A SIGNAL STRENGTH, OR INDICATION THEREOF, OF EACH OF THE DETECTED WIFI ROUTER ACCESS POINTS 1102

SELECTING THE CAPTURED INFORMATION OF THE ONE OF THE DETECTED WIFI ROUTER ACCESS POINTS ASSOCIATED WITH THE HIGHEST VALUE FOR SIGNAL STRENGTH 1104

FIG. 11

PROVISIONING HEADLESS WiFi DEVICES AND RELATED SYSTEMS, METHODS AND DEVICES

CROSS-REFERENCE TO RELATED APPLICATION

This application claims the benefit of the priority date of U.S. Provisional Patent Application No. 63/202,467, filed Jun. 11, 2021, and titled "PROVISIONING HEADLESS WIFI DEVICES AND RELATED SYSTEMS, METHODS AND DEVICES," the disclosure of which is incorporated herein in its entirety by this reference.

FIELD

One or more examples relate, generally, to wireless local area networks and headless wireless devices. One or more examples relate, generally, to provisioning a headless wireless device for establishing a communication link to a wireless router, wireless local area network, or a cloud server. Some examples relate to provisioning a headless wireless device for connecting to a residential wireless local area network. One or more examples relate, generally, to improving user experience inferring device settings, such as channel identifiers, so reduce setup time and limit reconnections.

BACKGROUND

There is an ever-expanding variety of devices that connect to an electronic network, such as wireless local area networks (WLAN) at a residence. Such a network is typically managed by a router, a device that, among other things, routes traffic (data packets) and manages requests by devices to connect to the network. Devices typically connect to a router via wired or unwired connections such as cables and wireless frequencies. Access points are devices that provide wireless connectivity between devices and a router. An access point typically has a wired connection to a router (e.g., an internal connection if a router has a built-in access point, or an Ethernet cable for a stand-alone access point, without limitation) and equipment to communicate wirelessly with other devices. Access points and other devices may be configured to use a variety of wireless communication protocols, but it is common for access points in residential networks to use communication protocols that are compliant with one of the Institute of Electrical and Electronics Engineers (IEEE) 802.11 standards for implementing WLAN computer communication, also referred to as "WiFi."

BRIEF DESCRIPTION OF THE DRAWINGS

To easily identify the discussion of any particular element or act, the most significant digit or digits in a reference number refer to the figure number in which that element is first introduced.

FIG. 4 is a flow diagram depicting a process performed at a provisioning WiFi device in connection with disclosed processes for provisioning a headless WiFi device of FIG. 1, FIG. 2, or FIG. 3.

FIG. 5B is a flow diagram depicting a continuation of a process performed at a headless WiFi device in connection with disclosed processes for provisioning a headless WiFi device of FIG. 1, FIG. 2, or FIG. 3.

FIG. 5C is a flow diagram depicting a continuation of a process performed at a headless WiFi device in connection with disclosed processes for provisioning a headless WiFi device of FIG. 1, FIG. 2, or FIG. 3.

FIG. 9 is a flow diagram depicting a process 900 for provisioning a headless WiFi device and connecting it to a WiFi router access point, in accordance with one or more examples FIG. 10A and FIG. 10B are flow diagrams that respectively depict a process for predicting a channel ID for a desired WiFi router access point, and a further process for utilizing such an inferred channel ID, in accordance with one or more examples.

FIG. 11 is a flow diagram depicting a process 1100 for inferring that a channel identifier is the channel identifier for a desired WiFi router access point, in accordance with one or more examples.

DETAILED DESCRIPTION

Figure 1:
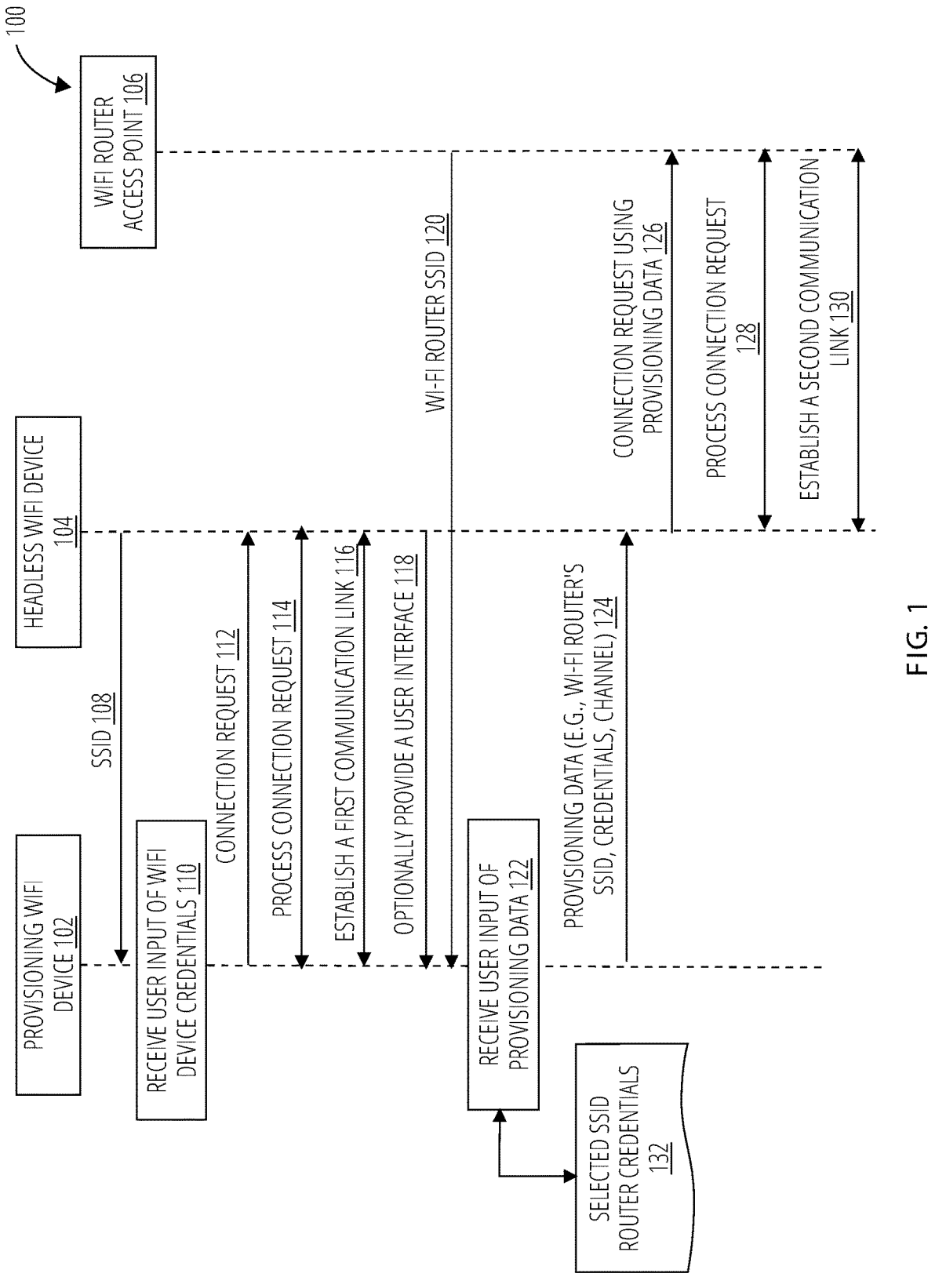
FIG. 1 is a diagram depicting a process for provisioning a headless WiFi device, in accordance with one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A router that has an internal access point or is coupled to a stand-alone access point is referred to herein as a "wireless router," and the access point of a wireless router is referred to herein as a "wireless router access point." A wireless router configured for WiFi connections is referred to herein as a "WiFi router," and an access point of a WiFi router is referred to herein as a "WiFi router access point." Notably, a disclosed WiFi router may have one or multiple (more than one) access points, that provide the same or different types of connectivity such as, 2.5-Ghz frequency band, 5-Ghz frequency band, secured, and unsecured, without limitation. A WiFi device is a device configured for WiFi connection to a WiFi access point, or to a WiFi router access point.

When a WiFi device desires to connect to a wireless router, typically, it will probe the WiFi signals and WiFi channels in its vicinity for the IEEE 802.11 wireless local area network (WLAN) service set identifier (SSID) broadcast by the WiFi router access point. When the WiFi device detects a WiFi router access point's SSID on a WiFi channel, it will send a connection request to the WiFi router using the detected SSID and channel of the WiFi router access point to notify the WiFi router that the WiFi device intends to attempt to connect to the WiFi router. When the WiFi router notifies the WiFi device that the WiFi router is ready for the WiFi device to attempt to connect, the WiFi device sends the WiFi router a description of the WiFi device's communication capabilities. If the capabilities are acceptable to the WiFi router, the WiFi router assigns the WiFi device an identifier, sends the WiFi device the identifier and notifies the WiFi device that the capabilities are acceptable and that the WiFi device may continue the connection process. The WiFi Device and WiFi router establish a secure communication link, which also serves to verify that the WiFi Device has the correct router credentials (e.g., a WiFi password, without limitation) for the WiFi router. Multiple techniques are available, and in use, to establish a secure communication link.

As a non-limiting example, the WiFi device and WiFi router may perform a key agreement protocol whereby each party contributes some information and then the parties perform a series of steps using the contributions and a shared secret (e.g., a WiFi password, without limitation) to generate encryption/decryption keys. If the WiFi device has the same shared secret as the WiFi router and performs the same key agreement protocol as the WiFi router, then the keys generated by the WiFi router and the WiFi device should be "symmetric." If the parties generate a set of symmetric keys, then the WiFi device should generate decryption keys that can be used to decrypt messages encrypted by the WiFi router using the WiFi router's generated encryption keys; and generate encryption keys to encrypt messages that the WiFi router can decrypt using the WiFi router's generated decryption keys. In the context of WiFi, a typical key agreement protocol is known as a "4-way handshake," so named because of four messages sent between the "authenticator" (e.g., the WiFi router) and the "supplicant" (e.g., the WiFi device). As another non-limiting example, a WiFi router and a WiFi device may perform a challenge-response protocol. In a challenge-response protocol the WiFi router sends the WiFi device a challenge that includes a challenge text that the WiFi device is supposed to encrypt using router credentials and send back to the WiFi router. If the WiFi device and WiFi router have the same router credentials, then when the WiFi router decrypts the encrypted response text it should recover the challenge text. Recovering the challenge text authenticates the WiFi device and the WiFi device and WiFi router may establish a secure communication link.

Provisioning of a wireless device, i.e., providing data to, or gathering data from, a wireless device to assist with a connection to a wireless router, is sometimes required because, as non-limiting examples, wireless router access points are typically configurable to communicate via a variety of wireless frequency bands and logical channels and often employ security measures (e.g., router credentials) to restrict access to the wireless router. The provisioning process requires receiving the data (referred to herein as "provisioning data") at a wireless device so that the wireless device can perform the operations to connect to the wireless router as discussed above.

Headless and zero UI (user interface) devices are devices configured to operate without a physical local interface such as a monitor, computer keyboard, computer mouse, touchpad, or touchscreen, without limitation. They may have some local interfacing capability via voice, gestures, or movement—but many such devices operate without any physical local interface. Such a device is referred to herein as a "headless device," and a headless device that is configured for wireless connections is referred to herein as a "headless wireless device." A headless wireless device configured for WiFi connections is referred to herein as a "headless WiFi device."

A headless wireless device does not have a physical local interface usable to input the provisioning data. While some headless wireless devices can at least partially provision themselves, such devices known to the inventor of this disclosure require the assistance of another device that has a physical local interface. Moreover, the self-provisioning processes known to the inventor of this disclosure typically require some probing of the wireless environment to discern communication settings. As the number of devices connected to a wireless router increase, the quantity of wireless signals in a given area also increases. Adding more wireless signals is undesirable at least, as non-limiting examples, because they may interfere with or degrade wireless connectivity between wireless devices.

One or more examples relate, generally, to systems, methods and devices for provisioning a headless WiFi device and more specifically, to a process of provisioning a headless WiFi device via a separate provisioning WiFi device in a manner that may reduce traffic handled by a WiFi router due to provisioning of a headless WiFi device and decrease time to connect to a WiFi router (and so improve a user experience), as compared to conventional provisioning processes known to the inventor of this disclosure.

FIG. 1 is a diagram depicting a process 100 for provisioning a headless WiFi device 104 for connecting to a WiFi router access point 106 using another WiFi enabled device, here provisioning WiFi device 102, which includes a physical local interface, in accordance with one or more examples.

At operation 108 of process 100, provisioning WiFi device 102 detects the presence of headless WiFi device 104 in response to an IEEE 802.11 wireless local area network (WLAN) service set identifier (SSID) broadcast (operation 108) by headless WiFi device 104. Headless WiFi device 104 may be, as non-limiting examples, a so called "smart" device such as an audio speaker, watch, home appliance, camera, door lock, wireless door bell, sensor (e.g., environmental sensor, utility sensor, security sensor, without limitation), or controller module (e.g., utility controller, security system controller, or media controller, without limitation). Provisioning WiFi device 102 may be a WiFi enabled device such as a smart phone, a tablet computer, a laptop computer, a desktop computer, or a wearable device with a physical local interface such as a smart watch, without limitation.

At operation 110 of process 100, provisioning WiFi device 102 receives user input of credentials, at a physical local interface of provisioning WiFi device 102, for authenticating with headless WiFi device 104. In some examples, such credentials may include a passphrase also stored at the headless WiFi device 104, as a non-limiting example, by a manufacturer.

At operation 112 of process 100, provisioning WiFi device 102 sends a connection request to headless WiFi device 104, and at operation 114 of process 100, headless WiFi device 104 and provisioning WiFi device 102 process the connection request. In one or more examples, headless WiFi device 104 may initialize in process 100 in a WiFi access point mode, such as a software enabled access point (SoftAP) or other virtual router mode, which enables a computing device that is not specifically configured as a WiFi router to nevertheless operate as one. In such examples, processing the connection request between provisioning WiFi device 102 and headless WiFi device 104 may include exchanging messages for a ready notice, description of communication capabilities of provisioning WiFi device 102, assigned identifier and approval to continue the connection process, as described above.

At operation 116 of process 100, provisioning WiFi device 102 and headless WiFi device 104 establish a first communication link, i.e., a WiFi communication link, that provisioning WiFi device 102 may use to transmit provisioning data that headless WiFi device 104 may use to connect to WiFi router access point 106. In one or more examples, such as examples where headless WiFi device 104 initialized in the WiFi access point mode, provisioning WiFi device 102 and headless WiFi device 104 may optionally secure the first communication link, as non-limiting examples, using a key agreement protocol (e.g., the 4-way handshake, without limitation) or a challenge-response. Provisioning WiFi device 102 participates in the securing of a second communication link, to be described below, using the credentials provided via the physical user interface at operation 110.

At optional operation 118 of process 100, headless WiFi device 104 optionally provides a user interface (i.e., sends a user interface definition) to provisioning WiFi device 102. In some examples, provisioning WiFi device 102 may execute a provisioning application (i.e., a software application) associated with headless WiFi device 104 and configured for guiding aspects of provisioning of headless WiFi device 104. In various examples, the provisioning application may include a user interface or use a user interface provided by the headless WiFi device. In other examples, such a provisioning application executed on provisioning WiFi device 102 may not have a user interface or may have a configurable user interface such that the types of data input can be configured for different use cases. As non-limiting examples, examples discussed with respect to FIG. 3 include input of cloud credentials together with router credentials, while others discussed with respect to FIG. 1 include input of just router credentials.

The user interface provided by headless WiFi device 104 may be a user interface definition, as non-limiting examples, in a markup language such as Hypertext Markup Language (HTML) or Extensible Markup Language (XML), without limitation, or an applet. An instance of the user interface definition may be executed in, or by, an application, as non-limiting examples, a browser, a mobile device, a tablet, or a personal computer.

At operation 120 of process 100, provisioning WiFi device 102 scans for and captures SSIDs and channel IDs of access points being broadcast in the vicinity of provisioning WiFi device 102, and detects and captures the SSID broadcast by WiFi router access point 106 and the channel ID of the channel on which the WiFi router access point 106 broadcasts.

At operation 122 of process 100, provisioning WiFi device 102 receives a user input (i.e., user input 132) of provisioning data, at a physical local interface of provisioning WiFi device 102, that headless WiFi device 104 may use to communicate with WiFi router access point 106, such as an SSID for WiFi router access point 106 and router credentials for WiFi router access point 106, without limitation. As a non-limiting example, provisioning WiFi device 102 may present the results of its scan to a user at a user interface and receive an indication of a selected SSID at the physical local interface of provisioning WiFi device 102. Such scan results may include SSIDs of access points that provisioning WiFi device 102 detected during its scan, and more specifically, include the WiFi router SSID of WiFi router access point 106, and in this specific example, the selected SSID is the WiFi router SSID of WiFi router access point 106. When provisioning WiFi device 102 receives the selected SSID it may optionally prompt the user for router credentials and/or cloud credentials (e.g., a username and/or a password, without limitation) as discussed herein.

In one or more examples, some or all of the provisioning data for WiFi router access point 106 may already be stored at provisioning WiFi device 102 when a user selects the WiFi router SSID. In some cases, provisioning WiFi device 102 may have already acquired and stored an SSID, channel ID and/or router credentials for WiFi router access point 106 because, for example, provisioning WiFi device 102 is on the WLAN managed by a router of WiFi router access point 106. In some cases, provisioning WiFi device 102 may acquire and store the SSID and channel ID used by WiFi router access point 106 in response to scanning for WiFi access points in the vicinity, and in response to a user selection of the WiFi router SSID, prompt the user to provide credentials that provisioning WiFi device 102 may utilize to establish a communication link with WiFi router access point 106.

At operation 124 of process 100, provisioning WiFi device 102 sends provisioning data to headless WiFi device 104, such as the WiFi router SSID, a channel ID, and router credentials, without limitation.

At operation 126 of process 100, headless WiFi device 104 sends a connection request to WiFi router access point 106 using the received provisioning data. As a non-limiting example, headless WiFi device 104 may send the connection request to the SSID of the WiFi router access point 106 on a channel corresponding to the channel ID of operation 124. Notably, since provisioning data sent by provisioning WiFi device 102 included a channel ID and SSID, the headless WiFi device 104 may send the connection request to WiFi router access point 106 without inquiring after the channel (e.g., without utilizing channel probing techniques, without limitation) on which WiFi router access point 106 operates. Headless WiFi device 104 may move directly to the channel ID provided with the provisioning data and attempt to establish a communication link with WiFi router access point 106.

At operation 128 of process 100, headless WiFi device 104 and WiFi router access point 106 process the connection request. In one or more examples, processing the connection request includes exchanging messages for a ready notice, description of communication capabilities, assigned identifier and approval to continue the connection process, as described above.

At operation 130 of process 100, headless WiFi device 104 and WiFi router access point 106 establish a second communication link (second for the headless WiFi device 104), i.e., a WiFi communication link. During operation 130 of process 100, headless WiFi device 104 and WiFi router access point 106 secure the second communication link as a non-limiting example, using a key agreement protocol (e.g., the 4-way handshake, without limitation) or a challenge-response. Headless WiFi device 104 participates in the securing of the second communication link using the router credentials that were included in the provisioning data provided by provisioning WiFi device at operation 124. In this manner, WiFi router access point 106 also verifies that headless WiFi device 104 is permitted to connect.

In some cases, an attacker may attempt to gain access to router credentials by sniffing the wireless signals transmitted between a headless WiFi device and a provisioning WiFi device. If the router credentials are sent to a headless WiFi device in cleartext then any attacker can sniff the router credentials. In order to prevent this, when a provisioning WiFi device and headless WiFi device establish a WiFi communication link, i.e., the first communication link, such a WiFi communication link may be secured using credentials of the headless WiFi device according to, as a non-limiting example, symmetric key, public/private key, or challenge-text cryptographic techniques. There is a risk, however, that the credentials will be compromised or even lost. It would increase the complexity for an attacker if the headless WiFi device credentials expire after a predetermined time period or change over time.

The inventor of this disclosure appreciates that a provisioning WiFi device can typically be located in close physical proximity (e.g., within a few feet, without limitation) of a headless WiFi device. A provisioning WiFi device located in close physical proximity of a headless WiFi device may receive messages sent by the headless WiFi device in a reduced transmit power mode. Assuming no interference (e.g., electromagnetic noise or physical structures, without limitation), the distance a given signal may be carried by electromagnetic waves increases as the power level of signal emitted from a source increases (measured, e.g., in decibels per milliwatt).

In one or more examples, a headless WiFi device transmits, via an unsecure communication link, security data to a provisioning WiFi device while the headless WiFi device is in a reduced transmit power mode. A provisioning WiFi device and headless WiFi device may use such security data to secure the previously unsecure communication link, as a non-limiting example, using symmetric key, public/private key, or challenge-response cryptography techniques. The provisioning WiFi device may transmit router credentials for a residential router to the headless WiFi device via the secured communication link. If an attacker captures the encrypted messages including the router credentials to the headless WiFi device, the message and router credentials would be unusable unless the attacker were located close enough to the headless WiFi device to sniff the security data securing the communication link between the provisioning WiFi device and the headless WiFi device.

Figure 2:
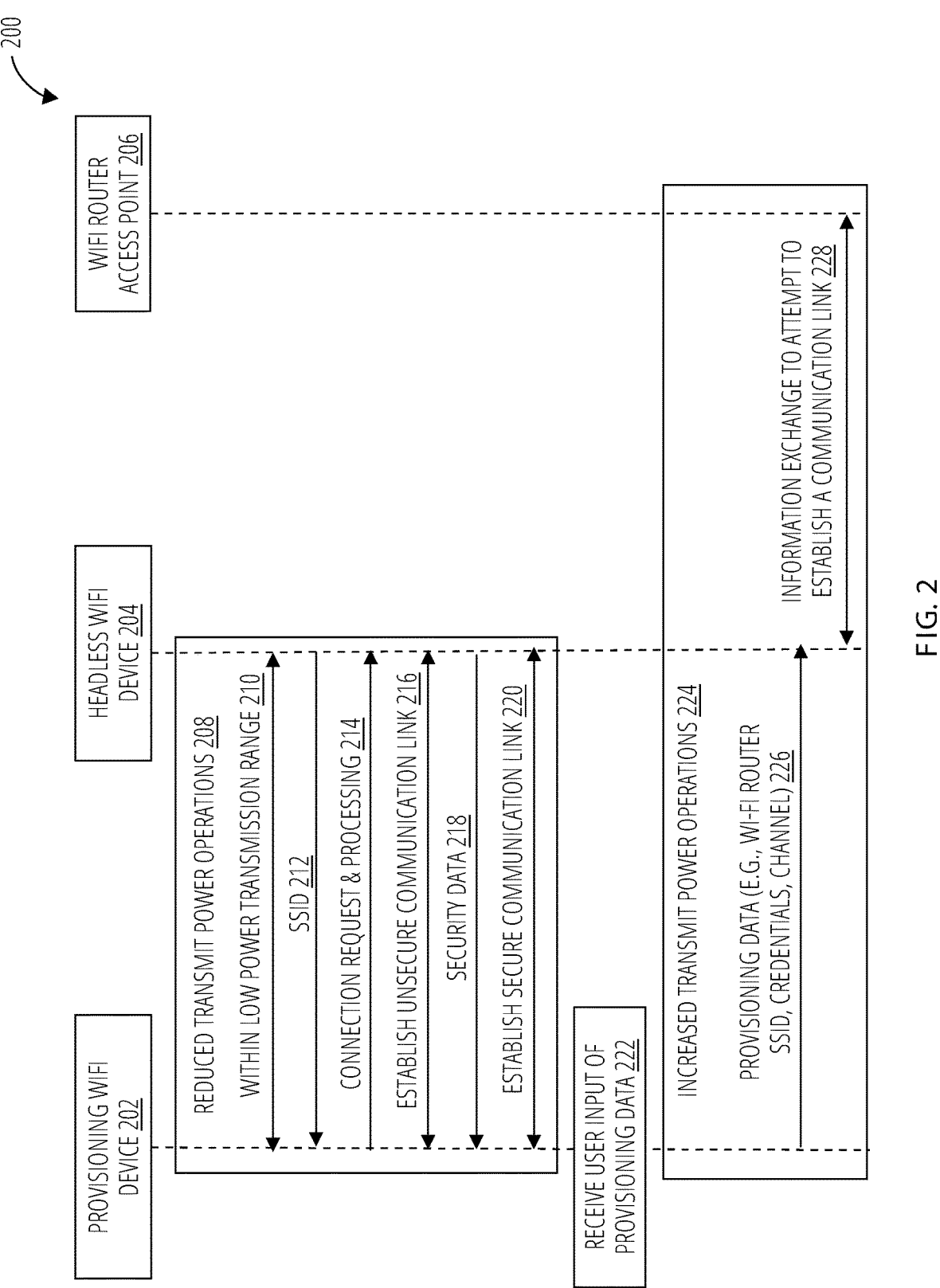
FIG. 2 is a diagram depicting a process for provisioning a headless WiFi device, in accordance with one or more examples.

FIG. 2 is a diagram depicting a process 200 for provisioning a headless WiFi device 204 that includes establishing a secure communication link between the provisioning WiFi device 202 and headless WiFi device 204 over which router credentials may be sent, in accordance with one or more examples. Process 200 includes reduced transmit power operations 208 including transfer of security data and establishing a secure WiFi communication link between provisioning WiFi device 202 and headless WiFi device 204, and increased transmit power operations 224 (where transmit power setting at headless WiFi device 204 has been increased from a setting during reduced transmit power operations 208 to a desired transmit power for "normal" operation in given operating conditions) including transfer of provisioning data and attempt to establish a WiFi communication link between headless WiFi device 204 and WiFi router access point 206. In some examples, such as the specific example depicted by FIG. 2, operation 226 may be performed during increased transmit power operations 224 as non-limiting examples, to reduce dropped connections or reduce susceptibility to interference in a case where headless WiFi device 204 provides provisioning WiFi device 202 a user interface definition. In other examples, operation 226 may be performed during reduced transmit power operations 208 without exceeding the scope of this disclosure. Moreover, there may be some variations in transmit power levels when performing operations during increased transmit power operations 224 and/or reduced transmit power operations 208 without exceeding the scope of this disclosure.

At operation 210 of process 200, provisioning WiFi device 202 and headless WiFi device 204 are arranged within a reduced power transmission range. Notably, while a desired transmit power may be configured at headless WiFi device 204, actual transmission range of a WiFi signal may be affected by a variety of factors, such as whether headless WiFi device 204 and provisioning WiFi device 202 have a line of sight, without limitation. As a non-limiting example, a transmission range may be discovered by locating provisioning WiFi device 202 progressively closer to headless WiFi device 204 until an SSID broadcast in reduced power transmit mode is detected.

At operation 212 of process 200, provisioning WiFi device 202 detects the presence of headless WiFi device 204 in response to an SSID broadcast by headless WiFi device 204. The SSID is broadcast by headless WiFi device 204 using a reduced transmit power so that if the provisioning WiFi device 202 is not within a reduced power transmission range of headless WiFi device 204 then it will not receive the broadcast of the SSID.

At operation 214 of process 200, provisioning WiFi device 202 transmits a connection request to headless WiFi device 204, optionally using a reduced transmit power that has a short transmission range, and provisioning WiFi device 202 and headless WiFi device 204 process the connection request as described above with respect to operation 112 and operation 114.

At operation 216 of process 200, provisioning WiFi device 202 and headless WiFi device 204 establish an unsecure communication link, i.e., an unsecure WiFi communication link, and at operation 218 of process 200, headless WiFi device 204 sends security data to provisioning WiFi device 202 using a reduced transmit power that has a short transmission range.

At operation 220 of process 200, provisioning WiFi device 202 and headless WiFi device 204 establish a secure communication link, i.e., a secure WiFi communication link, using the security data, as a non-limiting example, by securing the unsecured communication link at least partially in response to the security data, such as performing a key agreement protocol, public/private key process, or challenge-response process, as discussed above, to generate encryption/decryption keys. Operation 220 is performed using a reduced transmit power that has a short transmission range.

In some examples it may be desirable to use different security data for each attempt to establish a communication link between provisioning WiFi device 202 and headless WiFi device 204 (e.g., there may be multiple attempts to transfer security data and establish a secure communication link due to distance between the devices or susceptibility of lower power signals to interference due to physical objects or electromagnetic noise, without limitation). An encryption technique may be used that involves dynamically generated encryption keys such as the session keys generated in symmetric key techniques, without limitation.

At operation 222 of process 200, provisioning WiFi device 202 receives, at its physical user interface, a user input that includes provisioning data for the headless WiFi device 204.

At operation 226 of process 200, provisioning WiFi device 202 transmits the provisioning data to headless WiFi device 204 via the secure communication link there between. Operation 226 may be performed using an increased transmit power, i.e., as part of increased transmit power operations 224, as compared with reduced transmit power operations 208.

At operation 228 of process 200, headless WiFi device 204 attempts to establish a communication link with WiFi router access point 206 using the provisioning data (e.g., as described above in relation to operations 126, 128, and 130, without limitation) as part of increased transmit power operations 224 (where transmit power setting at headless WiFi device 204 has been increased from a setting during reduced transmit power operations 208 to a desired transmit power for "normal" operation in given operating conditions).

Some headless WiFi devices are configured to perform a host application, and in some cases, such a host application may require access to one or more services via the Internet, such as services provided on a cloud-computing platform. Many cloud servers require authentication before they will provide a requested service to a host application. However, in the absence of a physical local interface, providing such authentication is problematic, unless credentials for the service are pre-configured at a headless WiFi device. If a headless WiFi device needs to authenticate with a cloud server, then once the headless WiFi device is connected to the WiFi router, a provisioning WiFi device can send the cloud credentials to the headless WiFi device via the WiFi router. The inventor of this disclosure appreciates that providing cloud credentials with the provisioning data sent to the headless WiFi device would reduce traffic handled by the router and decrease time to connect to a cloud server (and so improve a user experience), as compared to conventional processes known to the inventor of this disclosure.

One or more examples relate, generally, to systems, methods and devices for provisioning a headless WiFi device where the headless WiFi device receives cloud credentials from a provisioning WiFi device when performing according to process 100 or process 200. The headless WiFi device may use the cloud credentials to authenticate with a cloud server via a connected router and the Internet.

Figure 3:
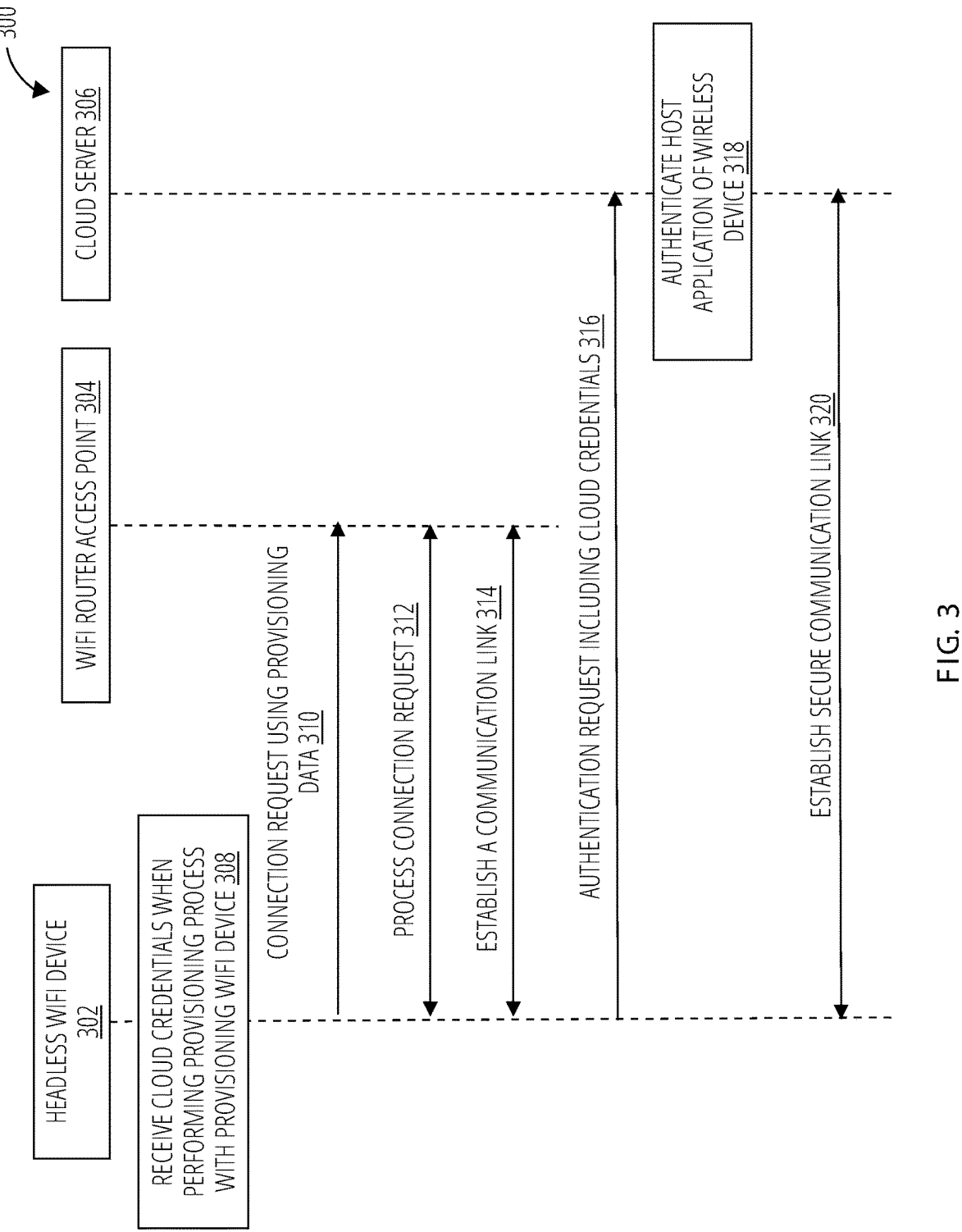
FIG. 3 is a diagram depicting a process for provisioning a headless WiFi device, in accordance with one or more examples.

FIG. 3 is a diagram depicting a process 300 where a headless WiFi device is provisioned for communication with a WiFi router access point and cloud server in a single provisioning process.

At operation 308 of process 300, cloud credentials are included with provisioning data received at Headless WiFi device 302 according to operations discussed herein with respect to process 100, e.g., as part of operations 122 and 124, or process 200, e.g., as part of operations 222 and 226. So, one or more examples of process 300 may be understood to begin after operation 124 of process 100 or operation 226 of process 200.

At operation 310 of process 300, Headless WiFi device 302 transmits a connection request to WiFi router access point 304 using the SSID and channel ID in the provisioning data.

At operation 312 of process 300, headless WiFi device 302 and WiFi router access point 304 process the connection request. In one example, processing the connection request includes exchanging messages for a ready notice, description of communication capabilities, assigned identifier and approval to continue the connection process, described above.

At operation 314 of process 300, headless WiFi device 302 and WiFi router access point 304 establish a communication link, in the case of headless WiFi device 302, using the router credentials received with the provisioning data during operation 308 (e.g., as described for operations 130, 228, without limitation).

At operation 316 of process 300, headless WiFi devices 302 transmits an authentication request including cloud credentials, received during operation 308, to cloud server 306 via WiFi router access point 304 and the Internet. At operation 318 of process 300, cloud server 306 authenticates headless WiFi devices 302 and at operation 320 the headless WiFi devices 302 and cloud server 306 establish a communication link (via WiFi router access point 304) over which cloud server 306 may provide services to headless WiFi devices 302 and a host application executing thereon.

FIG. 4 is a flow diagram depicting a process 400 performed by a provisioning application executing at a provisioning WiFi device as part of a disclosed provisioning process, such as at provisioning WiFi device 102 participating in a process 100, or a provisioning WiFi device 202 participation in a process 200, without limitation.

At operation 402, process 400 initiates execution of a provisioning application associated with a headless WiFi device. By way of non-limiting example, such a provisioning application may be a computer program installed or loaded onto the provisioning WiFi device 102 specifically configured to assist a user to configure a WiFi device, such as a headless WiFi device, that depends on another WiFi capable device to connect with a WiFi router access point.

At operation 404, process 400 requests a connection with the headless WiFi device, for example, as discussed above with respect to FIG. 1 by sending a connection request to the headless WiFi device or by being in sufficiently close physical proximity of the provisioning WiFi device to the headless WiFi device and sending a connection request as discussed above with respect to FIG. 2.

At operation 406, process 400 establishes a first communication link with the headless WiFi device. By way of non-limiting example, operation 406 may establish the communication link with the headless WiFi device using provisioning data for connecting the provisioning WiFi device to the headless WiFi device (e.g., a username and/or a password, without limitation) provided with the provisioning application at install, entered via a user interface of the provisioning WiFi device, provided by the headless WiFi device (e.g., as discussed with respect to FIG. 2), or transmitted by the headless WiFi device to the provisioning WiFi device using a reduced transmission power mode.

At operation 408, process 400 optionally receives a user interface definition provided by the headless WiFi device in, as non-limiting examples, a markup language such as Hypertext Markup Language (HTML) or Extensible Markup Language (XML).

At operation 410, process 400 scans wireless signals for WiFi access points in a vicinity of the provisioning WiFi device and obtains respective SSIDs and channel IDs (identifying the channels on which detected WiFi access points operate) for detected WiFi access points at least partially responsive to the scanning. Scanning for WiFi access points may include probing (e.g., using a request-response technique, without limitation) each of the various channels associated with WiFi communication to identify WiFi access points, if any, on a given channel.

At operation 412, process 400 presents, at a physical local interface of the provisioning WiFi device, the respective SSIDs of the detected WiFi access points and receives an indication identifying a selected one of the detected WiFi access points, where the selected one of the detected WiFi access points is a WiFi router access point. By way of a non-limiting example, scan results may be presented at a physical local interface that facilitates user interaction with a provisioning application performing process 400 and may receive information responsive to a user interaction with the scan results and thus generate an indication identifying a selected one of the detected WiFi access point, in this case the WiFi router access point.

At operation 414, process 400 receives, at the physical local interface, WiFi router credentials, and optionally cloud credentials, e.g., for a cloud server or cloud service.

At operation 416, process 400 transmits, to the headless WiFi device, provisioning data for the WiFi router access point such as SSID, router credentials, a channel ID, and optionally the cloud credentials, without limitation.

At operation 418, process 400 ends the first communication link with the headless WiFi device and ends execution of the provisioning application.

Figure 5A:
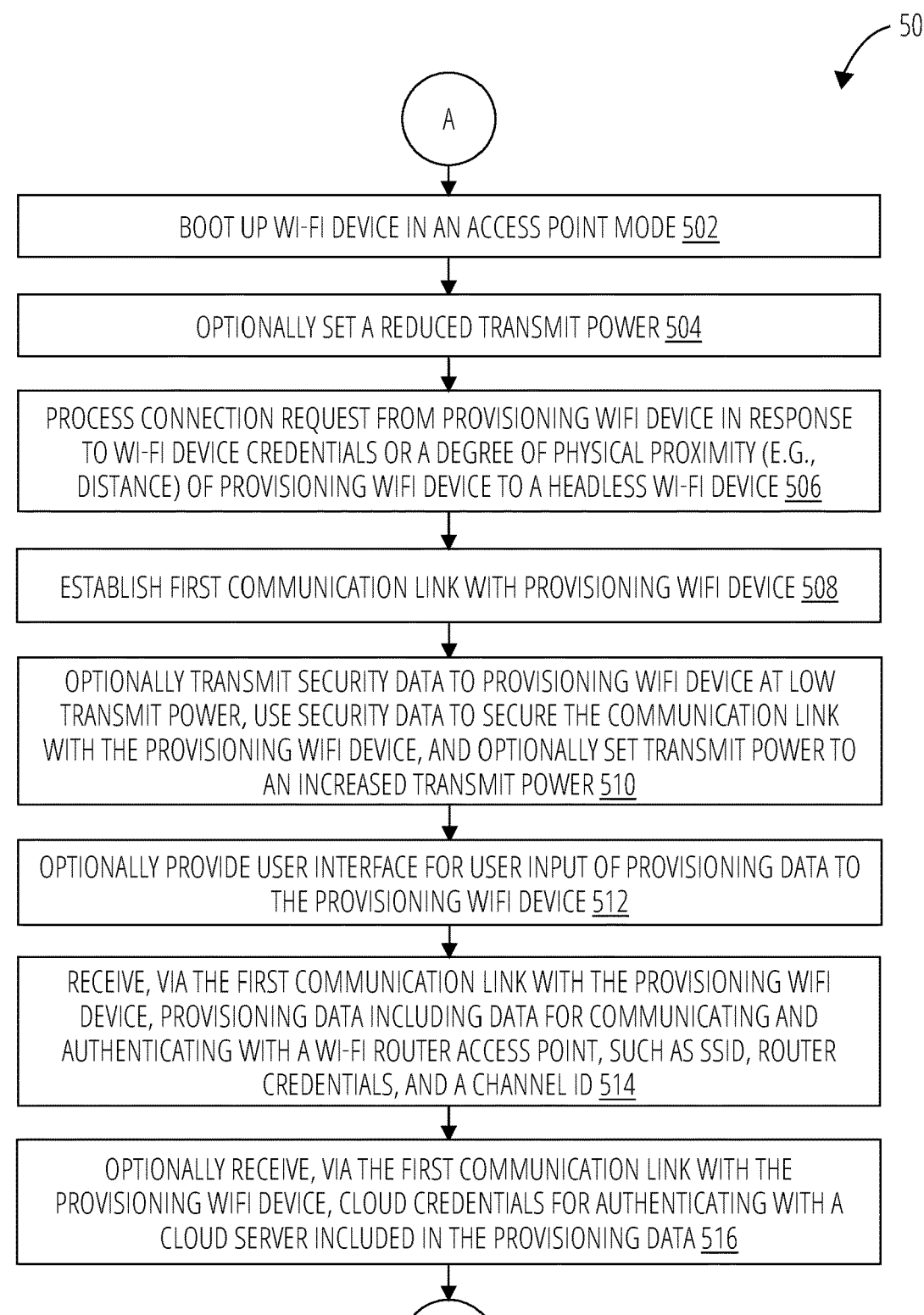
FIG. 5A is a flow diagram depicting a process performed at a headless WiFi device in connection with disclosed processes for provisioning a headless WiFi device of FIG. 1, FIG. 2, or FIG. 3.

FIG. 5A, FIG. 5B and FIG. 5C are flow diagrams depicting a process 500 performed at a headless WiFi device as part of a disclosed provisioning process. The process is depicted in three segments for clarity of description of logical segmentations of the process, but such segmentations are not intended to limit this disclosure in any way.

Turning to FIG. 5A, at operation 502, process 500 boots up a headless WiFi device in an access point mode, such as a software enabled access point (SoftAP) or other virtual router mode, which enables a computing device that has not been specifically configured as a WiFi router to nevertheless operate as one.

At optional operation 504, process 500 sets a reduced transmit power, as a non-limiting example, because process 500 will use a degree of physical proximity of a provisioning WiFi device to the headless WiFi device to authenticate the provisioning WiFi device as discussed herein.

At operation 506, process 500 processes a connection request from the provisioning WiFi device in response to, as non-limiting examples, a connection request transmitted by the provisioning WiFi device, which connection request is optionally at a reduced transmit power and thus may at least partially rely on a degree of physical proximity of the provisioning WiFi device to the headless WiFi device.

At operation 508, process 500 establishes a first communication link with the provisioning WiFi device.

As discussed herein, in some examples, the communication link established at operation 508 may be unsecure. At optional operation 510, process 500 transmits security data to the provisioning WiFi device at a reduced transmit power optionally set at operation 504. The headless WiFi device and the provisioning WiFi device use such security data to secure the first communication link between the provisioning WiFi device and the headless WiFi device as discussed above. Upon securing the first communication link, process 500 may increase the transmit power to a desired transmit power for "normal" operation of a headless WiFi device in given operating conditions.

At operation 512, process 500 optionally provides a user interface (e.g., user interface definition) for user input of provisioning data to the provisioning WiFi device. The provisioning data may include an SSID and credentials for a WiFi router access point, and may optionally include credentials for a cloud server.

At operation 514, process 500 receives, via the first communication link with the provisioning WiFi device (secure, or unsecure, as the case may be), provisioning data for communicating and authenticating with the WiFi router access point, such as SSID, channel ID, and/or router credentials, without limitation.

At operation 516, process 500 optionally receives, via the first communication link with the provisioning WiFi device, (secure, or unsecure, as the case may be), cloud credentials for authenticating with a cloud service, such cloud credential included in the provisioning data of operation 514.

Turning to FIG. 5B, at operation 518, process 500 performs a changeover of operation from the access point mode to a client mode, such as a WiFi station mode, without limitation. Optionally, the increased transmit power may be set if not set during operation 510.

At operation 520, process 500 uses the WiFi router SSID and channel ID included with the provisioning data to send a connection request to the WiFi router access point on a channel corresponding to the channel ID included in the provisioning data. In some examples, process 500 may optionally probe the WiFi channel associated with the channel ID to confirm the presence of the desired WiFi router access point on the channel, as a non-limiting example, and in case the WiFi device is out of range of the WiFi router access point the headless WiFi device can alert a user (e.g., via the provisioning WiFi device, without limitation) that the headless WiFi device should be moved closer to the WiFi router access point.

At operation 522, process 500 performs operations related to processing the connection request with the WiFi router access point (e.g., as described above with respect to operation 128, without limitation).

At operation 524, process 500 establishes a second communication link between the headless WiFi device in client mode and the WiFi router access point using the router credentials provided with the provisioning data.

Notably, process 500 may send a connection request to, and establish a communication link with, a WiFi router access point without independently discovering a channel on which the WiFi router access point operates. This enables faster connectivity and a better user experience than conventional headless WiFi devices known to the inventor that probe WiFi channels to discover the presence of a desired WiFi router access point on a given channel. Moreover, the disclosed provisioning process may reduce wireless traffic associated with probing various channels as compared to a conventional provisioning process where a wireless device probes each WiFi channel to inquire about the presence of a desired WiFi router access point.

Turning to FIG. 5C, the operations depicted by FIG. 5C relate to disclosed examples where a headless WiFi device authenticates with a cloud server. At operation 526, process 500 sends an authentication request to a cloud server via the WiFi router access point and the Internet. At operation 528, process 500 establishes a third communication link with the cloud server, and at operation 530, process 500 receives cloud services via the third communication link with the cloud server.

As discussed herein, a headless WiFi device may serve a user interface that is configured according to the provisioning data that will be collected. For example, a user interface having specific fields and layout may be served when collecting an SSID and router credentials, and another user interface having different fields and layout may be served when collecting SSID, router credentials, and cloud credentials.

Figure 6A:
FIG. 6A is a diagram of an example user interface for collecting provisioning data at a provisioning WiFi device, in accordance with one or more examples.

FIG. 6A is a schematic diagram of a user interface 600a that may be used to collect SSID and password (router credentials) for connecting to, and authenticating with, a WiFi router access point. There are fields 602 for user input of an SSID associated with a desired WiFi router access point and a Password for authenticating with the desired WiFi router access point.

Figure 6B:
FIG. 6B is a diagram of an example user interface for collecting provisioning data at a provisioning WiFi device, in accordance with one or more examples.

FIG. 6B is a schematic diagram of a user interface 600b that may be used to collect SSID and password (router credentials) for connecting to, and authenticating with, a WiFi router access point and a cloud username and cloud password for connecting to and authenticating with a cloud server. There are fields 604 for user input of an SSID associated with a desired WiFi router access point, a password for authenticating with the desired WiFi router access point, and a Cloud Username and Cloud Password for authenticating with a desired cloud server.

User interface 600a and user interface 600b are non-limiting examples of user interfaces the definitions for which may be incorporated into a provisioning application or provided by a headless WiFi device to a provisioning device (e.g., operation 118, operation 408, and operation 512, without limitation). Other variations of user interfaces may be used without exceeding the scope of this disclosure.

Figure 7:
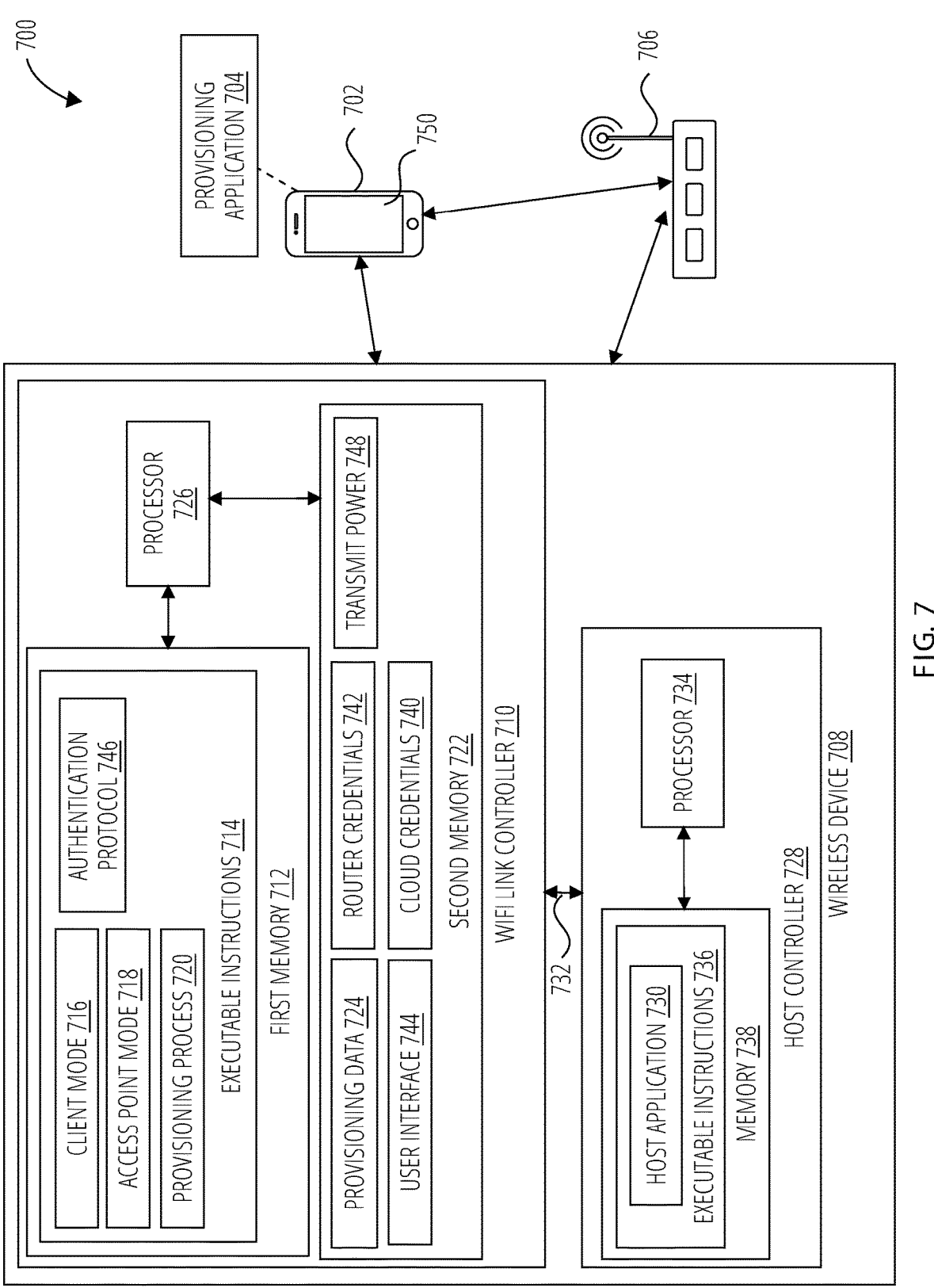
FIG. 7 is a block diagram of a system for provisioning an example of a headless WiFi device, in accordance with one or more examples.

FIG. 7 is a block diagram depicting a system 700 to perform one or more features or functions of the disclosed provisioning processes, such as process 100, process 200, or process 300, without limitation. System 700 includes provisioning WiFi device 702 having a physical local interface 750 (in this specific non-limiting example a touchscreen) and executing provisioning application 704, WiFi router access point 706, and wireless device 708, which are non-limiting examples of provisioning WiFi device 102/202/302, WiFi router access point 106/206/304, and headless WiFi device 104/204/302.

Wireless device 708 includes host controller 728, generally, to execute one or more processes of host application 730 at wireless device 708 such as for features or functions of so called "smart" or internet protocol (IP) capable device such as an audio speaker, watch, home appliance, camera, door lock, wireless door bell, sensor (e.g., environmental sensor, utility sensor, security sensor, without limitation), controller module (e.g., utility controller, security system controller, or media controller, without limitation). Host controller 728 may include executable instructions 736 stored at memory 738 that, when executed by processor 734, enable processor 734 to perform processes related to host application 730.

Wireless device 708 includes a WiFi link controller 710 coupled to host controller 728 via interface 732, generally, to perform one or more processes related to WiFi communication. WiFi link controller 710 includes first memory 712, second memory 722 and processor 726. Executable instructions 714 stored at first memory 712, when executed by processor 726, enable processor 726 to perform processes related to one or more of client mode 716, access point mode 718, authentication protocol 746, and provisioning process 720 discussed herein.

Provisioning data 724 stored at second memory 722 may include one or more of SSID, channel ID and/or router credentials discussed herein for establishing a communication link with WiFi router access point 706. User interface 744 stored at second memory 722 is a user interface definition for, as non-limiting examples, user interface 600a or user interface 600b. Cloud credentials 740 stored at second memory 722 are credentials for authenticating to a cloud server and accessing services. Router credentials 742 stored at second memory 722 are credentials for accessing WiFi router access point 706. Transmit power 748 stored at second memory 722 is a value for setting/increasing/decreasing a transmit power of WiFi link controller 710 and wireless device 708 more generally. For example, processor 726 may set transmit power 748 to a value so as to decrease or set a reduced transmit power when authenticating a provisioning WiFi device at least partially based on proximity and sending security data to a provisioning WiFi device, and to increase or set an increased transmit power when receiving router credentials and authenticating with a WiFi router access point, as discussed herein.

In some cases, it may be desirable for a headless WiFi device to send a notification to a provisioning WiFi device to inform the provisioning WiFi device that the headless WiFi device successfully connected to a WiFi router access point.

In one or more examples, a disclosed headless WiFi device may initialize and execute (e.g., at boot up, without limitation) a multi-connection maintaining mode that enables it to share its wireless interface between an access point mode and a station mode (referred to herein generally as a "concurrent mode"). Concurrent mode enables the headless WiFi device to concurrently operate as a virtual router connected to a provisioning WiFi device and a client connected to a WiFi router access point. During a contemplated operation, the headless WiFi device may maintain its connection with the provisioning WiFi device while the headless WiFi device attempts to connect to the WiFi router access point. Upon successfully connecting to the WiFi router access point, the headless WiFi device sends a notification to the provisioning WiFi device utilizing the connection with the virtual router.

In some cases, a wireless interface can only communicate over a single channel at a time, even if a multi-connection maintaining mode is executing. If a connection with a provisioning WiFi device utilizes a different channel than a WiFi router access point to which the headless WiFi device desires to connect, when the headless WiFi device attempts to connect to the WiFi router access point the headless WiFi device may lose its connection with the provisioning WiFi device. In some cases, the provisioning WiFi device and headless WiFi device will reconnect. To reconnect, the settings of a virtual router at the headless WiFi device are updated to the channel ID utilized by a WiFi router access point and then the virtual router of the headless WiFi device begins to operate on the new channel. The provisioning WiFi device, often operated by a user, detects the presence of the headless WiFi device on the new channel and reconnects. In some cases, a provisioning WiFi device does not receive any notification that the headless WiFi device successfully connected to a WiFi router access point and a user has to use some ad hoc method to learn whether the headless WiFi device successfully connected to the WiFi router access point such as operation of a host application that utilizes a service over a WiFi network.

The inventors of this disclosure appreciate that it may be desirable for a headless WiFi device to predict a channel on which a desired WiFi router access point operates and set an access point mode to utilize the inferred channel.

In one or more examples, upon initializing a multi-connection mode, a headless WiFi device may capture information about SSIDs and active WiFi router access points more generally. The headless WiFi device may probe WiFi signals and WiFi channels in its vicinity for SSIDs. When the headless WiFi device detects an SSID on a WiFi channel, it may capture information about the WiFi router access point, such as SSID, WiFi channel ID, and a measure of the probability that a given SSID corresponds to a desired WiFi router access point, without limitation. The headless WiFi device may select the channel ID having the greatest associated probability of correspondence to a desired WiFi router access point and may utilize the selected channel ID for the access point mode (i.e., the headless WiFi device broadcasts its SSID on a WiFi channel that corresponds to the channel ID).

In one or more examples, when a headless WiFi device captures information about multiple SSIDs, a headless WiFi device may infer that a given SSID and associated WiFi router access point corresponds to a desired WiFi router access point at least partially responsive to relative signal strength indications, such as Received Signal Strength Indications (RSSI), without limitation. In one or more examples, when a headless WiFi device captures information about multiple SSIDs, a headless WiFi device may capture information about the quantity of network traffic on a given SSID, determine a relative quantity of traffic among various detected SSIDs during a given interval, and infer that one of the detected SSIDs is the desired WiFi router access point. In one or more examples, a headless WiFi device may utilize values for quantity of network traffic, signal strength indication, and/or relative relationships thereof, to infer that an SSID is the SSID of a desired WiFi router access point. For example, the highest quantity of network traffic and/or highest value of signal strength indication, may be indicative of a residential WiFi router.

Figure 8:
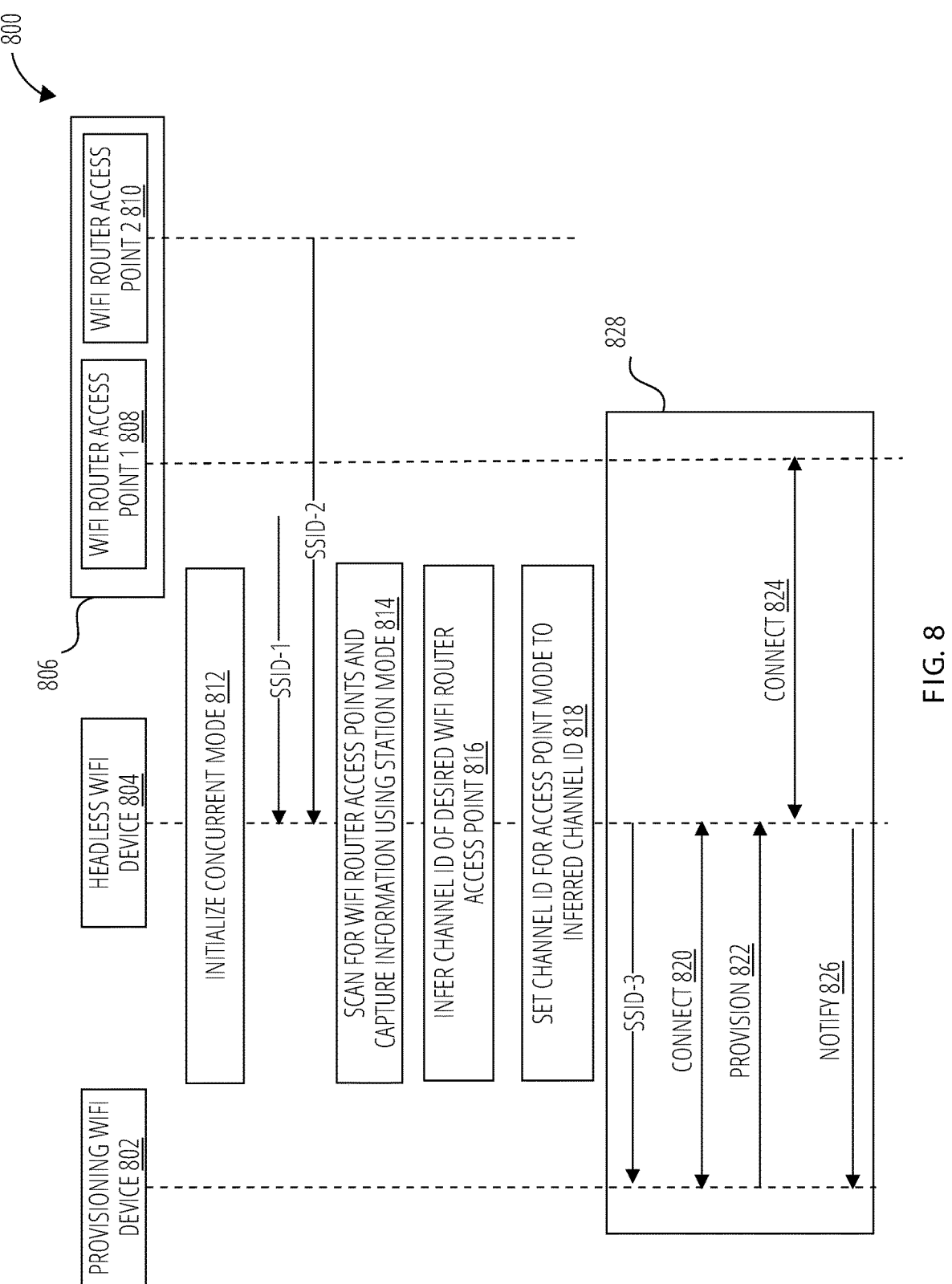
FIG. 8 is a diagram depicting a process for provisioning a headless WiFi device, in accordance with one or more examples.

FIG. 8 is a flow diagram depicting a process 800 for predicting a WiFi channel of a desired WiFi router access point, in accordance with one or more examples. In the specific example depicted by FIG. 8, headless WiFi device 804 utilizes provisioning WiFi device 802 to connect to a desired one of WiFi router access point 1 808 and WiFi router access point 2 810 of WiFi router access points 1 to N 806.

At operation 812, headless WiFi device 804 initializes in a concurrent mode, in which it can simultaneously be connected to both provisioning WiFi device 802 and one of WiFi router access points 1 to N 806 in its vicinity. Upon initializing in concurrent mode, headless WiFi device 804 is not connected to any WiFi router access points 1 to N 806 in its vicinity.

WiFi router access point 1 808 and WiFi router access point 2 810 both broadcast their SSIDs. At operation 814, headless WiFi device 804, utilizing the station mode of its initialized concurrent mode, scans for WiFi router access points and captures information about detected SSIDs, including SSID-1 associated with WiFi router access point 1 808 and SSID-2 associated with WiFi router access point 2 810.

At operation 816, headless WiFi device 804 infers the channel ID of a desired WiFi router access point. In one or more examples, headless WiFi device 804 may infer a channel ID at least partially responsive to a measurement, such as a signal strength indication, without limitation. Headless WiFi device 804 may select for its prediction the channel ID for the SSID having the greatest value for signal strength indication.

At operation 818, headless WiFi device 804 sets the channel ID for its access point mode to the inferred channel ID of operation 816.

In one or more examples, upon setting the channel ID for the access point mode to the inferred channel ID, headless WiFi device 804 may optionally perform one or more operations 828, and broadcast its SSID, SSID-3, utilizing the access point mode of its concurrent mode. At operation 820, headless WiFi device 804 and provisioning WiFi device 802 connect as discussed herein according one or more examples. At operation 822 provisioning WiFi device 802 provisions headless WiFi device 804 as discussed herein according to one or more examples. At operation 824, headless WiFi device 804 connects to WiFi router access point 1 808 (the desired WiFi router access point) using provisioning data provided by provisioning WiFi device 802 at operation 822 according to one or more examples. At operation 826, headless WiFi device 804 notifies provisioning WiFi device 802 that headless WiFi device 804 successfully connected to WiFi router access point 1 808, and in particular, sends the notification utilizing the connection established at operation 820.

In the specific example contemplated by FIG. 8, headless WiFi device 804 successfully predicts the channel ID of the desired router access point in operation 816. It is specifically contemplated that in some instances, the inferred channel ID and the WiFi channel used by the desired WiFi router access point will not be the same (i.e., headless WiFi device 804 incorrectly predicts the channel ID), in which case, headless WiFi device 804 may lose its connection with provisioning WiFi device 802 upon sending a connection request to WiFi router access point 1 808 on a different channel ID at operation 824.

FIG. 9 is a flow diagram depicting a process 900 for provisioning a headless WiFi device and connecting it to a WiFi router access point, in accordance with one or more examples.

At operation 902, process 900 infers that a first channel identifier is a channel identifier of a desired WiFi router access point.

In operation 904, process 900 establishes a first communication link with a provisioning WiFi device utilizing the first channel identifier.

In operation 906, process 900 establishes a second communication link with a WiFi router access point utilizing a second channel identifier provided by the provisioning WiFi device.

FIG. 10A and FIG. 10B are flow diagrams that depict a process 1000a for predicting a channel ID for a desired WiFi router access point, and a process 1000b for utilizing such an inferred channel ID, in accordance with one or more examples.

Turning to process 1000a, at operation 1002, process 1000a initializes in a concurrent mode of operation, as discussed herein. At operation 1004, process 1000a probes, utilizing a station mode of the concurrent mode, WiFi signals and WiFi channels in its vicinity for IEEE 802.11 wireless local area network (WLAN) service set identifiers (SSIDs) broadcast by one or more WiFi router access points. At operation 1006, process 1000a captures information about detected WiFi router access points, including SSID, channel ID, and a signal measurement, as discussed herein. At operation 1008, process 1000a predicts a channel ID of a desired WiFi router access point at least partially utilizing the captured information from operation 1006. At operation 1010, process 1000a optionally sets the channel ID for an access point mode of the concurrent mode to the inferred channel ID.

Turning to process 1000b, a continuation of process 1000a, at operation 1012, process 1000b establishes a first communication link with a provisioning WiFi device utilizing the access point mode of the concurrent mode and the inferred channel ID. At operation 1014, process 1000b receives the provisioning data from the provisioning WiFi device via the first communication link. At operation 1016, process 1000b establishes a second communication link with a WiFi router access point utilizing the station mode and the received provisioning data. At operation 1018, process 1000b optionally establishes a third communication link with the provisioning WiFi device utilizing the inferred channel identifier. In one or more examples, WiFi device may utilize the inferred channel identifier at least partially responsive to determining that the inferred channel identifier and the channel identifier included with the provisioning data, are different.

At operation 1020, process 1000b notifies the provisioning WiFi device of successful connection to the WiFi router access point utilizing the first communication link or the optional third communication link.

In one or more examples, after a headless WiFi device infers the channel identifier for the desired WiFi router access point and connects to the provisioning device, in one or more examples, the provisioning WiFi device provides a channel identifier in the provisioning data. The provisioned channel identifier is the actual channel on which the desired WiFi router access points operates. If the headless WiFi device determines that the provisioned channel identifier is different than the inferred channel identifier, the headless WiFi router informs the provisioning WiFi device of the difference, and the provisioning WiFi device automatically or upon request by the headless WiFi device, moves to the channel corresponding to the inferred channel identifier. This may further reduce setup time and improve user experience, as it may not be apparent to a user that the provisioning WiFi device disconnected from the headless WiFi device and then reconnected later upon moving channels.

FIG. 11 is a flow diagram depicting a process 1100 for inferring that a channel identifier is the channel identifier for a desired WiFi router access point, in accordance with one or more examples.

At operation 1102, process 1100 obtains a value for a signal strength, or indication thereof, of each of the detected WiFi router access points. A signal strength value is used to infer a relationship between a detected WiFi router access point and a desired WiFi router access point, where the relationship is stronger the greater the signal strength value. The detected WiFi router access point having a greatest associated signal strength value is inferred to be the desired WiFi router access point, for example, because a user desires to connect to a WiFi router access point for a limited space, such as a residence or office, without limitation.

At operation 1104, process 1100 selects the captured information of the one of the detected WiFi router access points associated with the highest value for signal strength as a inferred, or inferred, WiFi router access point, and its channel identifier as the inferred, or inferred channel identifier.

Figure 12:
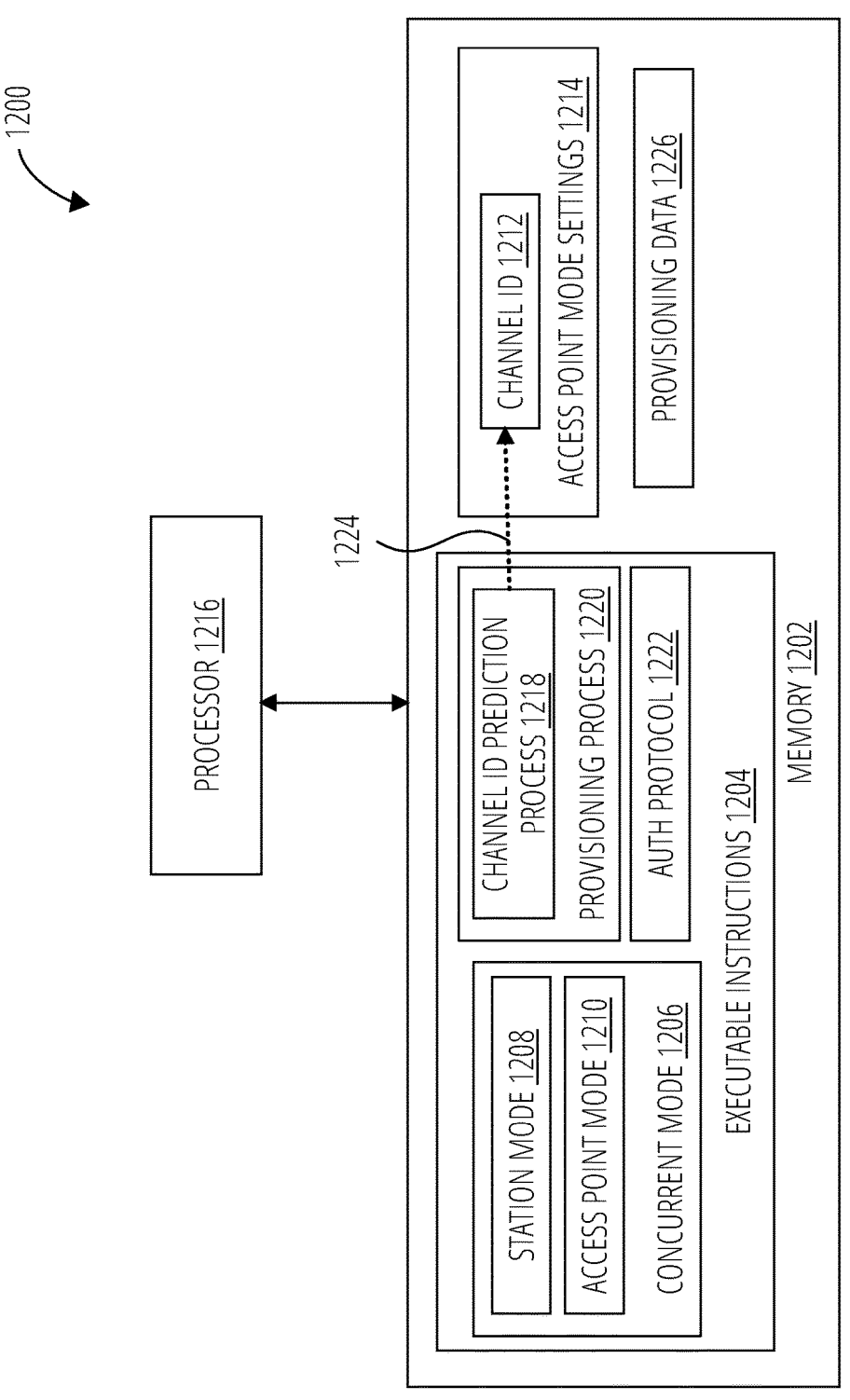
FIG. 12 is a block diagram of a system for provisioning an example of a headless WiFi device, in accordance with one or more examples.

FIG. 12 is a block diagram depicting a WiFi link controller 1200 to perform one or more features of functions of process 800, process 1000a and process 1000b at a headless WiFi device, such as headless WiFi device 804, without limitation.

WiFi link controller 1200, generally, performs one or more processes related to WiFi communication. WiFi link controller 1200 includes memory 1202 and processor 1216. Executable instructions 1204 stored at memory 1202, when executed by processor 1216, enable processor 1216 to perform some or a totality of features and functions related to a concurrent mode 1206, and, more specifically, access point mode 1210 and station mode 1208, channel ID prediction process 1218 of a provisioning process 1220, and authentication protocol 1222.

Channel ID prediction process 1218, generally, predicts a channel ID of a desired WiFi router access point as discussed herein, and sets the channel ID 1212 in the access point mode settings 1214 used by access point mode 1210 to a inferred channel ID 1224. Provisioning process 1220 generally performs some or a totality of features and functions for provisioning a headless WiFi device that includes WiFi link controller 1200 discussed herein. In one or more examples, channel ID prediction process 1218 is a function of provisioning process 1220, and in a contemplated operation, authentication protocol 1222 may invoke channel ID prediction process 1218 to predict a channel ID of a desired WiFi router access point and then provide inferred channel ID 1224 to channel ID 1212 of access point mode settings 1214

Authentication protocol 1222 may utilize provisioning data 1226 and station mode 1208 to establish a communication link with a WiFi router access point as discussed herein. By way of non-limiting example, provisioning data 1226 may include one or more of SSID, channel ID and/or router credentials discussed herein for establishing a communication link with a WiFi router access point Optionally, one or more elements of WiFi link controller 1200 may be combined with elements of WiFi link controller 710 such that a resultant WiFi link controller can perform a combination of the features and functions discussed herein. As a non-limiting example, to perform channel ID prediction and reduced transmit power operations for establishing a communication link with a provisioning WiFi device, provisioning of cloud credentials and channel ID prediction, channel ID prediction and provisioning of a headless WiFi device using provisioning data provided by a user at a provisioning WiFi device, and combinations thereof.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). As used herein, "each" means some or a totality. As used herein, "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: A method, comprising: inferring that a first channel identifier is a channel identifier of a desired WiFi router access point; establishing a first communication link with a provisioning WiFi device utilizing the first channel identifier; and establishing a second communication link with a WiFi router access point utilizing a second channel identifier provided by the provisioning WiFi device.

Example 2: The method according to Example 1, comprising: initializing a WiFi concurrent mode; probing WiFi signals and WiFi channels for presence of WiFi router access points; capturing information about detected WiFi router access points; inferring that the first channel identifier is the channel identifier of the desired WiFi router access point at least partially responsive to the captured information; and setting a channel identifier for an access point mode utilizing the first channel identifier.

Example 3: The method according to any of Examples 1 and 2, wherein initializing the WiFi concurrent mode comprises initializing a WiFi mode for operating concurrently in a WiFi station mode and a WiFi access point mode.

Example 4: The method according to any of Examples 1 through 3, comprising: utilizing a WiFi station mode of the WiFi concurrent mode to probe the WiFi signals and WiFi channels for presence of WiFi router access points and to capture the information about detected WiFi router access points.

Example 5: The method according to any of Examples 1 through 4, comprising: transmitting a service set identifier utilizing a WiFi channel that corresponds to the set channel identifier.

Example 6: The method according to any of Examples 1 through 5, comprising: responsive to the first channel identifier and the second channel identifier being the same:

utilizing the first communication link to notify the provisioning WiFi device about successful connection to the WiFi router access point.

Example 7: The method according to any of Examples 1 through 6, comprising: responsive to the first channel identifier and the second channel identifier being different: establishing a third communication link with the provisioning WiFi device utilizing the second channel identifier; and utilizing the third communication link to notify the provisioning WiFi device about successful connection to the WiFi router access point.

Example 8: A WiFi link controller for a headless WiFi device, the WiFi link controller comprising: a processor; and a memory including executable instructions stored thereon that, when executed by the processor, enable the processor to: infer that a first channel identifier is a channel identifier of a desired WiFi router access point; establish a first communication link with a provisioning WiFi device utilizing the first channel identifier; and establish a second communication link with a WiFi router access point utilizing a second channel identifier provided by the provisioning WiFi device.

Example 9: The WiFi link controller for the headless WiFi device according to Example 8, wherein the executable instructions stored on the memory, when executed by the processor, enable the processor to: initialize a WiFi concurrent mode; probe WiFi signals and WiFi channels for presence of WiFi router access points; capture information about detected WiFi router access points; infer that the first channel identifier is the channel identifier of the desired WiFi router access point at least partially responsive to the captured information; and set a channel identifier for an access point mode utilizing the first channel identifier.

Example 10: The WiFi link controller for the headless WiFi device according to any of Examples 8 and 9, wherein the WiFi concurrent mode comprises a WiFi mode for operating concurrently in a WiFi station mode and a WiFi access point mode.

Example 11: The WiFi link controller for the headless WiFi device according to any of Examples 8 through 10, wherein the executable instructions stored on the memory, when executed by the processor, enable the processor to: utilize a WiFi station mode of the WiFi concurrent mode to probe the WiFi signals and WiFi channels for presence of WiFi router access points and capture the information about detected WiFi router access points.

Example 12: The WiFi link controller for the headless WiFi device according to any of Examples 8 through 11, wherein the executable instructions stored on the memory, when executed by the processor, enable the processor to: transmit a service set identifier utilizing a WiFi channel that corresponds to the set channel identifier.

Example 13: The WiFi link controller for the headless WiFi device according to any of Examples 8 through 12, wherein the executable instructions stored on the memory, when executed by the processor, enable the processor to: responsive to the first channel identifier and the second channel identifier being same: utilize the first communication link to notify the provisioning WiFi device about successful connection to the WiFi router access point.

Example 14: The WiFi link controller for the headless WiFi device according to any of Examples 8 through 13, wherein the executable instructions stored on the memory, when executed by the processor, enable the processor to: responsive to the first channel identifier and the second channel identifier being different: establish a third communication link with the provisioning WiFi device utilizing the second channel identifier; and utilize the third communication link to notify the provisioning WiFi device about successful connection to the WiFi router access point.

What is claimed is:

1. A method to provision a headless WiFi device via a separate provisioning WiFi device, the method comprising:

booting up the headless WiFi device in a WiFi access point mode that utilizes a first channel identifier corresponding to a channel on which a desired WiFi router access point is inferred to operate;

establishing a first communication link with the separate provisioning WiFi device utilizing the first channel identifier;

responsive to the headless WiFi device determining that the first channel identifier and a channel identifier provided by the separate provisioning WiFi device are the same, establishing a communication link with the desired WiFi router access point utilizing the first channel identifier, and informing, via the first communication link with the separate provisioning WiFi device utilizing the first channel identifier, the separate provisioning WiFi device about connection status with the desired WiFi router access point; and responsive to the headless WiFi device determining that the first channel identifier and the channel identifier provided by the separate provisioning WiFi device are different, informing the separate provisioning WiFi device of this difference to move the separate provisioning WiFi device to a channel corresponding to the channel identifier provided by the separate provisioning WiFi device, establishing a communication link with the desired WiFi router access point utilizing the channel identifier provided by the separate provisioning WiFi device, and informing, via a second communication link with the separate provisioning WiFi device utilizing the channel identifier provided by the separate provisioning WiFi device, the separate provisioning WiFi device about connection status with the desired WiFi router access point.

2. The method of claim 1, comprising:

initializing a WiFi concurrent mode;

probing WiFi signals and WiFi channels for presence of WiFi router access points;

capturing information about detected WiFi router access points;

inferring that the first channel identifier is the channel identifier of the desired WiFi router access point at least partially responsive to the captured information; and setting a channel identifier for an access point mode utilizing the first channel identifier.

3. The method of claim 2, wherein initializing the WiFi concurrent mode comprises initializing a WiFi mode for operating concurrently in a WiFi station mode and a WiFi access point mode.

4. The method of claim 2, comprising:

utilizing a WiFi station mode of the WiFi concurrent mode to probe the WiFi signals and WiFi channels for presence of WiFi router access points and to capture the information about detected WiFi router access points.

5. The method of claim 2, comprising:

transmitting a service set identifier utilizing a WiFi channel that corresponds to the set channel identifier.

6. The method of claim 1, comprising:

responsive to the first channel identifier and the second channel identifier being the same:

utilizing the first communication link to notify the separate provisioning WiFi device about successful connection to the desired WiFi router access point.

7. The method of claim 1, comprising:

responsive to the first channel identifier and the second channel identifier being different:

establishing a third communication link with the separate provisioning WiFi device utilizing the second channel identifier; and utilizing the third communication link to notify the separate provisioning WiFi device about successful connection to the desired WiFi router access point.

8. A WiFi link controller for a headless WiFi device, the WiFi link controller comprising:

a processor; and a memory including executable instructions stored thereon that, when executed by the processor, enable the processor to:

boot up the headless WiFi device in a WiFi access point mode that utilizes a first channel identifier corresponding to a channel on which a desired WiFi router access point is inferred to operate;

establish a first communication link with the separate provisioning WiFi device utilizing the first channel identifier;

responsive to the headless WiFi device determining that the first channel identifier and a channel identifier provided by the separate provisioning WiFi device are the same, establish a communication link with the desired WiFi router access point utilizing the first channel identifier, and inform, via the first communication link with the separate provisioning WiFi device utilizing the first channel identifier, the separate provisioning WiFi device about connection status with the desired WiFi router access point; and responsive to the headless WiFi device determining that the first channel identifier and the channel identifier provided by the separate provisioning WiFi device are different, inform the separate provisioning WiFi device of this difference to move the separate provisioning WiFi device to a channel corresponding to the channel identifier provided by the separate provisioning WiFi device, establish a communication link with the desired WiFi router access point utilizing the channel identifier provided by the separate provisioning WiFi device, and inform, via a second communication link with the separate provisioning WiFi device utilizing the channel identifier provided by the separate provisioning WiFi device, the separate provisioning WiFi device about connection status with the desired WiFi router access point.

9. The WiFi link controller for the headless WiFi device of claim 8, wherein the executable instructions stored on the memory, when executed by the processor, enable the processor to:

initialize a WiFi concurrent mode;

probe WiFi signals and WiFi channels for presence of WiFi router access points;

capture information about detected WiFi router access points;

infer that the first channel identifier is the channel identifier of the desired WiFi router access point at least partially responsive to the captured information; and set a channel identifier for an access point mode utilizing the first channel identifier.

10. The WiFi link controller for the headless WiFi device of claim 9, wherein the WiFi concurrent mode comprises a WiFi mode for operating concurrently in a WiFi station mode and a WiFi access point mode.

11. The WiFi link controller for the headless WiFi device of claim 9, wherein the executable instructions stored on the memory, when executed by the processor, enable the processor to:

utilize a WiFi station mode of the WiFi concurrent mode to probe the WiFi signals and WiFi channels for presence of WiFi router access points and capture the information about detected WiFi router access points.

12. The WiFi link controller for the headless WiFi device of claim 9, wherein the executable instructions stored on the memory, when executed by the processor, enable the processor to:

transmit a service set identifier utilizing a WiFi channel that corresponds to the set channel identifier.

13. The WiFi link controller for the headless WiFi device of claim 8, wherein the executable instructions stored on the memory, when executed by the processor, enable the processor to:

responsive to the first channel identifier and the second channel identifier being same:

utilize the first communication link to notify the provisioning WiFi device about successful connection to the WiFi router access point.

14. The WiFi link controller for the headless WiFi device of claim 8, wherein the executable instructions stored on the memory, when executed by the processor, enable the processor to:

responsive to the first channel identifier and the second channel identifier being different:

establish a third communication link with the provisioning WiFi device utilizing the second channel identifier; and utilize the third communication link to notify the provisioning WiFi device about successful connection to the WiFi router access point.

15. A method to provision a headless WiFi device via a separate provisioning WiFi device, the method comprising:

booting up the headless WiFi device in a WiFi access point mode that utilizes a first channel identifier corresponding to a channel on which a desired WiFi router access point is inferred to operate;

establishing a first communication link with the separate provisioning WiFi device utilizing the first channel identifier;

responsive to the headless WiFi device determining that the first channel identifier and a second channel identifier provided by the separate provisioning WiFi device are the same:

attempting to establish a communication link with the desired WiFi router access point utilizing the first channel identifier, and informing, via the first communication link the separate provisioning WiFi device about connection status with the desired WiFi router access point;

responsive to the headless WiFi device determining that the first channel identifier and the second channel identifier are different:

moving the separate provisioning WiFi device to a channel corresponding to the second channel identifier;

informing, via a second communication link, the separate provisioning WiFi device about connection status with the desired WiFi router access point; and establishing a communication link with the desired WiFi router access point utilizing the second channel identifier without independently discovering a channel on which the desired WiFi router access point operates.

16. The method of claim 15, comprising:

initializing a WiFi concurrent mode;

probing WiFi signals and WiFi channels for presence of WiFi router access points;

capturing information about detected WiFi router access points;

inferring that the first channel identifier is a channel identifier of the desired WiFi router access point at least partially responsive to the captured information; and setting a channel identifier for an access point mode utilizing the first channel identifier, wherein initializing the WiFi concurrent mode comprises initializing a WiFi mode for operating concurrently in a WiFi station mode and the WiFi access point mode.

17. The method of claim 16, comprising:

utilizing a WiFi station mode of the WiFi concurrent mode to probe the WiFi signals and WiFi channels for presence of WiFi router access points and to capture the information about detected WiFi router access points;

transmitting a service set identifier utilizing a WiFi channel that corresponds to the set channel identifier; and responsive to the first channel identifier and the second channel identifier being the same:

utilizing the first communication link to notify the separate provisioning WiFi device about successful connection to the desired WiFi router access point.

18. The method of claim 15, comprising:

responsive to the first channel identifier and the second channel identifier being different:

establishing a third communication link with the provisioning WiFi device utilizing the second channel identifier; and utilizing the third communication link to notify the separate provisioning WiFi device about successful connection to the desired WiFi router access point.

19. A WiFi link controller for a headless WiFi device, the WiFi link controller comprising:

a processor; and a memory including executable instructions stored thereon that, when executed by the processor, enable the processor to:

boot up the headless WiFi device in an access point mode that utilizes a first channel identifier corresponding to a channel on which a desired WiFi router access point is inferred to operate;

establish a first communication link with the separate provisioning WiFi device utilizing the first channel identifier;

responsive to the headless WiFi device determining that the first channel identifier and a second channel identifier provided by the separate provisioning WiFi device are the same, attempt to establish a communication link with the desired WiFi router access point utilizing the first channel identifier, and inform, via the first communication link the separate provisioning WiFi device about connection status with the desired WiFi router access point;

responsive to the headless WiFi device determining that the first channel identifier and the second channel identifier are different, move the separate provisioning WiFi device to a channel corresponding to the second channel identifier, and inform, via a second communication link, the separate provisioning WiFi device about connection status with the desired WiFi router access point; and establish a communication link with the desired WiFi router access point utilizing the second channel identifier without independently discovering a channel on which the desired WiFi router access point operates.

20. The WiFi link controller for the headless WiFi device of claim 19, wherein the executable instructions stored on the memory, when executed by the processor, enable the processor to:

initialize a WiFi concurrent mode;

probe WiFi signals and WiFi channels for presence of WiFi router access points;

capturing information about detected WiFi router access points;

infer that the first channel identifier is a channel identifier of the desired WiFi router access point at least partially responsive to the captured information; and set a channel identifier for an access point mode utilizing the first channel identifier, wherein initializing the WiFi concurrent mode comprises initializing a WiFi mode for operating concurrently in a WiFi station mode and the WiFi access point mode, wherein the WiFi concurrent mode comprises a WiFi mode for operating concurrently in a WiFi station mode and the WiFi access point mode.

21. The WiFi link controller for the headless WiFi device of claim 20, wherein the executable instructions stored on the memory, when executed by the processor, enable the processor to:

utilize a WiFi station mode of the WiFi concurrent mode to probe the WiFi signals and WiFi channels for presence of WiFi router access points and capture the information about detected WiFi router access points; and transmit a service set identifier utilizing a WiFi channel that corresponds to the set channel identifier.

22. The WiFi link controller for the headless WiFi device of claim 19, wherein the executable instructions stored on the memory, when executed by the processor, enable the processor to:

responsive to the first channel identifier and the second channel identifier being same:

utilize the first communication link to notify the separate provisioning WiFi device about successful connection to the desired WiFi router access point;

responsive to the first channel identifier and the second channel identifier being different:

establish a third communication link with the separate provisioning WiFi device utilizing the second channel identifier; and utilize the third communication link to notify the separate provisioning WiFi device about successful connection to the desired WiFi router access point.

* * * * *